(12) United States Patent (10) Patent No.: US 12,589,290 B2
Yang (45) Date of Patent: Mar. 31, 2026

(54) FUNCTION BUTTON MODULE WITH VARIABLE FUNCTION LAYOUT AND GAME CONTROLLER

(71) Applicant: Shenzhen Jierui Hong Electronics Co., LTD, Shenzhen (CN)

(72) Inventor: Yumei Yang, Shenzhen (CN)

( * ) Notice: Subject to any disclaimer, the term of this patent is extended or adjusted under 35 U.S.C. 154(b) by 270 days.

(21) Appl. No.: 18/600,945

(22) Filed: Mar. 11, 2024

(65) Prior Publication Data

US 2025/0153039 A1 May 15, 2025

Related U.S. Application Data

(63) Continuation-in-part of application No. 18/510,118, filed on Nov. 15, 2023, now Pat. No. 12,496,515.

(51) Int. Cl.
| | |
|---|---|
| *A63F 13/24* | (2014.01) |
| *A63F 13/22* | (2014.01) |
| *H01H 13/14* | (2006.01) |

(52) U.S. Cl.
CPC .............. *A63F 13/24* (2014.09); *A63F 13/22* (2014.09); *H01H 13/14* (2013.01)

(58) Field of Classification Search
CPC ...... A63F 13/24; A63F 13/22; F21V 19/0015; F21Y 2113/13; F21Y 2115/10; H01H 13/14
See application file for complete search history.

(56) References Cited

FOREIGN PATENT DOCUMENTS

CN 217567399 U * 10/2022

OTHER PUBLICATIONS

Espace translation of CN217567399U (Year: 2025).*

* cited by examiner

*Primary Examiner* — Peter J Iannuzzi
(74) *Attorney, Agent, or Firm* — Daniel M. Cohn; Howard M. Cohn

(57) ABSTRACT

A function button module with variable function layout and game controller, comprising: a transparent pressing member; a plurality of transparent supporting members; an annular character changing plectrum; a driving assembly. The bottom of the transparent pressing member is equipped with indicator lights. The top of the transparent supporting member are equipped with transparent buttons, and the annular character changing plectrum is movable between the transparent button and the transparent supporting member. The driving part is rotationally connected to the annular character changing plectrum, which is equipped with a first through hole group and a second through hole group corresponding to different layouts. By driving the annular character changing plectrum, the light emitted by the indicator light can be mapped onto transparent buttons through the first through hole group or second through hole group. Thus, the layout of functional buttons can be changed to adapt to different types of game controllers.

17 Claims, 14 Drawing Sheets

FUNCTION BUTTON MODULE WITH VARIABLE FUNCTION LAYOUT AND GAME CONTROLLER

TECHNICAL FIELD

The present disclosure relates to a technical field of game controller buttons, and in particular to a function button module with variable function layout and game controller.

BACKGROUND

The ABXY button layout function operations of game controllers currently on the market are fixed and cannot be changed. One is the Switch controller button layout, and the other is the XBOX controller button layout, but now the multi-functional game controller can play different game devices. It can play games on the Switch game console, or on XBOX, PC, Android and other devices.

However, different game controllers have different ABXY button layouts, and the ABXY button function operations on different game consoles are different. When the Switch game controller is used to play games on PC, the ABXY button layout has the opposite function of the conventional PC controller ABXY button layout. In this way, you will not be able to use the BAYX button operations normally in PC games, which will cause misoperation of the game.

SUMMARY

In order to solve the problem that the existing game controller has a single function button layout and cannot adapt to the needs of different types of games, the present disclosure provides the function button module with variable function layout and game controller, comprising: a transparent pressing member; a plurality of transparent supporting members; an annular character changing plectrum; a driving assembly; wherein the transparent pressing member includes a plurality of pressing parts distributed in an annular shape, and an indicator light is provided at the bottom of each pressing part; the plurality of transparent supporting members include a support plate and two support columns arranged at both ends of the support plate. The support plate is arranged on the top of the pressing part, and transparent buttons are provided on the two support columns; the annular character changing plectrum is movably arranged on the support plate, and is engaged between the two support columns of each transparent supporting member, so that the annular character changing plectrum rotates around the center of the plurality of support plates when driven; the annular character changing plectrum is provided with a first through hole group and a second through hole group corresponding to different function button layouts; the output part of the driving assembly is rotationally connected to the annular character changing plectrum, when the driving assembly is driven, the annular character changing plectrum is driven to rotate until each through hole of the first through hole group faces the bottom of each transparent button or each through hole of the second through hole group faces the bottom of each transparent button.

Furthermore, the outer edge of the annular character changing plectrum is provided with first gear teeth, the driving assembly includes a motor switch, a motor assembly and a first gear provided at the output end of the motor assembly, and the first gear meshes with the first gear teeth, the motor switch is electrically connected to the motor assembly; when the motor switch is turned on, the motor assembly drives the annular character changing plectrum to rotate through the first gear.

Furthermore, the outer edge of the annular character changing plectrum is provided with first gear teeth, and the driving assembly includes a second gear and a first rotating shaft, the second gear meshes with the first gear teeth, the top end of the first rotating shaft is fixedly connected to the second gear, and the bottom end of the first rotating shaft is provided with a first groove body, when the first rotating shaft is rotated, the second gear drives the annular character changing plectrum to rotate.

Furthermore, the outer edge of the annular character changing plectrum is provided with first gear teeth, and the driving assembly includes a transmission gear set and a rack; a second gear teeth and a toggle part are respectively provided on both sides of the rack, and the transmission gear set meshes with the first gear teeth and the second gear teeth respectively; when the toggle part is toggled, the annular character changing plectrum is driven to rotate through the transmission gear set.

Furthermore, the outer edge of the annular character changing plectrum is provided with first gear teeth, and the driving assembly includes a third gear, a fourth gear and a knob part, the center of the knob part is connected to the center of the fourth gear, and the third gear meshes with the first gear teeth and the fourth gear respectively, when the knob part is rotated, the fourth gear drives the annular character changing plectrum to rotate through the third gear.

Furthermore, further comprising a plectrum support member, the plectrum support member is disposed at the gap between the plurality of transparent supporting members, the plectrum support member is connected to the casing of the game controller, and the top surface of the plectrum support member and the top surface of the support plate are on the same plane.

Furthermore, the inner edge of the annular character changing plectrum is provided with first gear teeth, and the driving assembly includes a fifth gear and a second rotating shaft, the fifth gear meshes with the first gear teeth, the bottom end of the second rotating shaft is fixedly connected to the fifth gear, and the top end of the second rotating shaft is provided with a second groove body, when the second rotating shaft is rotated, the fifth gear drives the annular character changing plectrum to rotate.

Furthermore, the driving assembly also includes a limiting member and an elastic member, the middle part of the plectrum support member is directly opposite to the annular character changing plectrum, and the middle part of the plectrum support member is provided with a mounting hole; limiting grooves are provided on both sides of the mounting hole, and the diameter of the limiting member matches the diameter of the mounting hole; first limiting protrusions are provided on both sides of the limiting member, and the first limiting protrusions are arranged in the limiting grooves, the elastic member is provided between the bottom of the limiting member and the bottom of the mounting hole, and the bottom surface of the fifth gear is provided with a first groove and a second groove, the top surface of the limiting member is provided with a second limiting protrusion, when the second rotating shaft is rotated, the fifth gear drives the annular character changing plectrum to rotate, when the annular character changing plectrum is rotated until each through hole of the first through hole group is facing the bottom of each transparent button or each through hole of the second through hole group is facing the bottom of each transparent button, the second limiting protrusion is locked into the first groove or the second groove.

Furthermore, the indicator light is a two-color indicator light. When the annular character changing plectrum is rotated until each through hole of the first through hole group is facing the bottom of each transparent button, the two-color indicator light emits light of a first color, and when each through hole of the second through hole group faces the bottom of each transparent button, the two-color indicator light emits light of a second color.

In order to solve the above problems, the present disclosure also provides a game controller, comprising: the casing, the left joystick assembly, the right joystick assembly, the direction button assembly and the function button assembly; a circuit board is provided in the casing, and button holes are provided on the casing, the left joystick assembly, the right joystick assembly, the direction button assembly are arranged in corresponding button holes, wherein the function button assembly includes the function button module with variable functional layout of claim 1, the functional button module includes the indicator light, the transparent button, the transparent pressing member, the plurality of transparent supporting members, the annular character changing plectrum and the driving assembly, the indicator light is disposed at a preset function button position on the circuit board, and the transparent pressing member is disposed at the function button position, the transparent button is arranged in the button hole, the driving assembly is arranged in the casing, and a third through hole is provided on the casing, a driving part of the driving assembly extends from the third through hole to the outside of the casing; when the drive assembly is driven, the driving assembly drives the annular character changing plectrum to rotate until each through hole of the first through hole group faces the bottom of each transparent button or the second through hole group faces the bottom of each transparent button.

Furthermore, the outer edge of the annular character changing plectrum is provided with the first gear teeth, the driving assembly includes the motor switch, the motor assembly and the first gear provided at the output end of the motor assembly, the first gear meshes with the first gear teeth, and the motor switch is electrically connected with the motor assembly, the motor assembly is arranged in the casing, and the motor switch extends from the third through hole to the outside of the casing, when the motor switch is turned on, the motor assembly drives the annular character changing plectrum to rotate through the first gear.

Furthermore, the outer edge of the annular character changing plectrum is provided with the first gear teeth, and the driving assembly includes the second gear and the first rotating shaft, the second gear meshes with the first gear teeth, and the top end of the first rotating shaft is fixedly connected with the second gear, the third through hole is provided on the bottom surface of the casing, and the bottom end of the first rotating shaft extends through the third through hole to the outside of the casing, the first groove body is provided at the bottom end of the first rotating shaft; when the first rotating shaft is rotated, the second gear drives the annular character changing plectrum to rotate.

Furthermore, the outer edge of the annular character changing plectrum is provided with the first gear teeth, and the driving assembly includes the transmission gear set and the rack, the second gear teeth and the toggle part are respectively provided on both sides of the rack, the support column is provided in the casing, and the transmission gear set is movably provided on the support column, the transmission gear set meshes with the first gear teeth and the second gear teeth respectively, and the toggle part extends through the third through hole to the outside of the casing, when the toggle part is toggled, the annular character changing plectrum is driven to rotate through the transmission gear set.

Furthermore, the outer edge of the annular character changing plectrum is provided with the first gear teeth, and the driving assembly includes the third gear, the fourth gear and the knob part, the center of the knob part is connected to the center of the fourth gear, and the third gear meshes with the first gear teeth and the fourth gear respectively, when the knob part is rotated, the fourth gear drives the annular character changing plectrum to rotate through the third gear.

Furthermore, wherein the function button module also includes the plectrum support member, the plectrum support member is disposed at the gap between the plurality of transparent supporting members, the plectrum support member is connected to the casing of the game controller, and the top surface of the plectrum support member and the top surface of the support plate are on the same plane.

Furthermore, the inner edge of the annular character changing plectrum is provided with first gear teeth, and the driving assembly includes the fifth gear and the second rotating shaft, the fifth gear meshes with the first gear teeth, the bottom end of the second rotating shaft is fixedly connected to the fifth gear, the third through hole is provided on the top surface of the casing, and the top end of the second rotation shaft extends through the third through hole to the outside of the casing, and the top end of the second rotating shaft is provided with the second groove body, when the second rotating shaft is rotated, the fifth gear drives the annular character changing plectrum to rotate.

Furthermore, the driving assembly also includes the limiting member and an elastic member, the middle part of the plectrum support member is directly opposite to the annular character changing plectrum, and the middle part of the plectrum support member is provided with the mounting hole; limiting grooves are provided on both sides of the mounting hole, and the diameter of the limiting member matches the diameter of the mounting hole; the first limiting protrusions are provided on both sides of the limiting member, and the first limiting protrusions are arranged in the limiting grooves, the elastic member is provided between the bottom of the limiting member and the bottom of the mounting hole, and the bottom surface of the fifth gear is provided with the first groove and the second groove, the top surface of the limiting member is provided with the second limiting protrusion, when the second rotating shaft is rotated, the fifth gear drives the annular character changing plectrum to rotate, when the annular character changing plectrum is rotated until each through hole of the first through hole group is facing the bottom of each transparent button or each through hole of the second through hole group is facing the bottom of each transparent button, the second limiting protrusion is locked into the first groove or the second groove.

Compared with the prior art, the function button module with variable function layout of the present invention sets the indicator light at the bottom of the transparent pressing member. Then the transparent supporting member is arranged on the transparent pressing member, and the transparent button is arranged on the support column of the transparent supporting member, so that there is a certain gap between the transparent button and the support plate of the transparent supporting member. Then the annular character changing plectrum is movably arranged on the support plates of multiple transparent supporting members, and it is engaged between the two support columns of each transparent supporting member, so that the annular character changing plectrum rotates around the center of the plurality of support plates when driven, then set the first through hole group and the second through hole group on the annular character changing plectrum. The shapes of the first through hole group and the second through hole group are different, so that the first through hole group and the second through hole group respectively correspond to different function button layouts. Then use the driving assembly to rotate and connect with the annular character changing plectrum. When the driving assembly is driven, drive the annular character changing plectrum to rotate until each through hole in the first through hole group is facing the bottom of each transparent button or each through hole in the second through hole group is facing the bottom of each transparent button. Thereby, when the light emitted by the indicator light passes through the transparent pressing member, the transparent supporting member and the first through hole group in sequence, a pattern corresponding to the first function button layout can be mapped on the transparent button. When the light emitted by the indicator light passes through the transparent pressing member, the transparent supporting member and the second through hole group in sequence, a pattern corresponding to the second function button layout can be mapped on the transparent button, this allows users to obtain the layout information of function buttons through the patterns mapped on the transparent buttons, thereby enabling the game controller to adapt to different game requirements, meet user needs, and be more practical.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained of the drawings without creative efforts.

6

Figure 11:
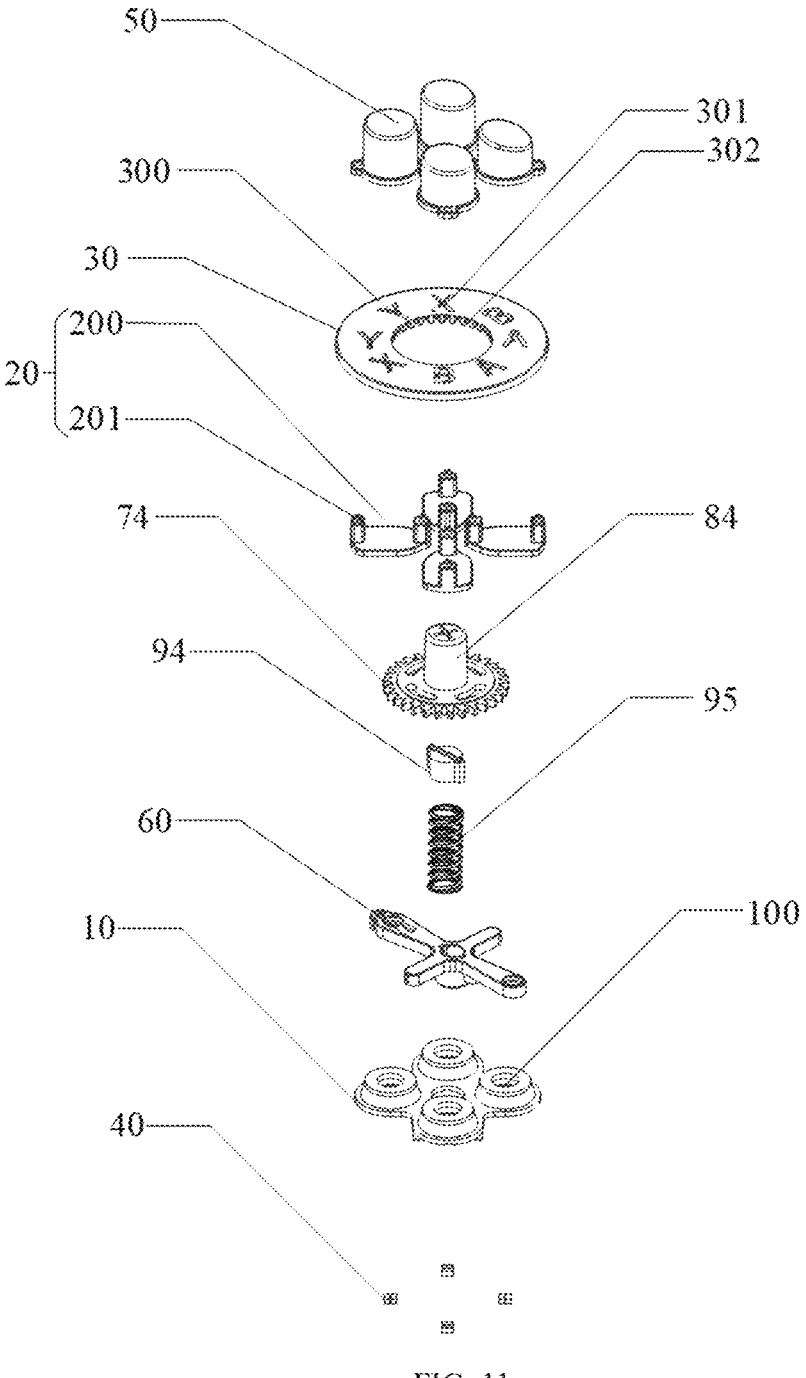

FIG. 11 is a schematic structural diagram of the fifth embodiment of the function button module with variable function layout.

Figure 12:
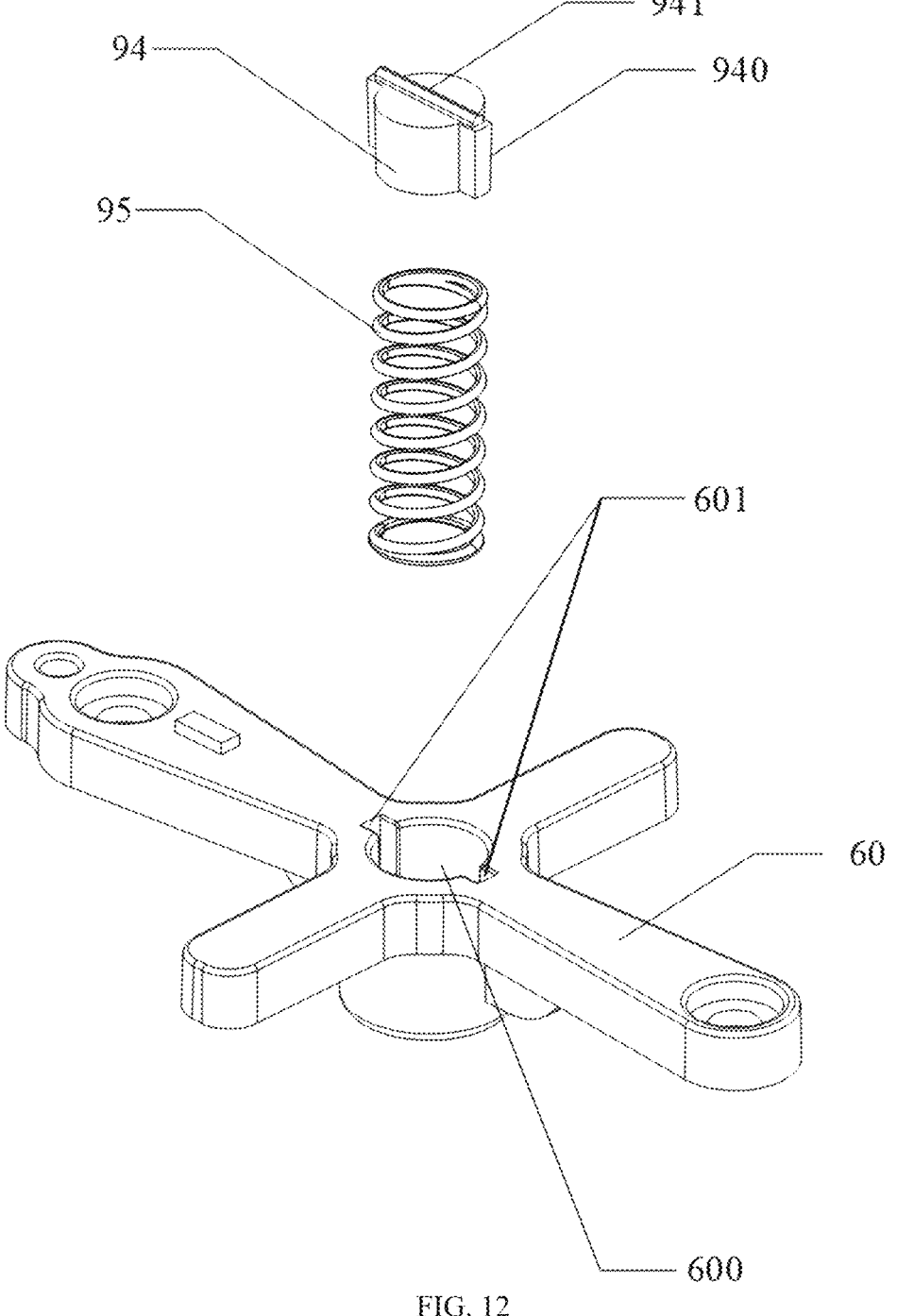

FIG. 12 is a partial structural schematic diagram of the fifth embodiment of the function button module with variable function layout.

Figure 13:
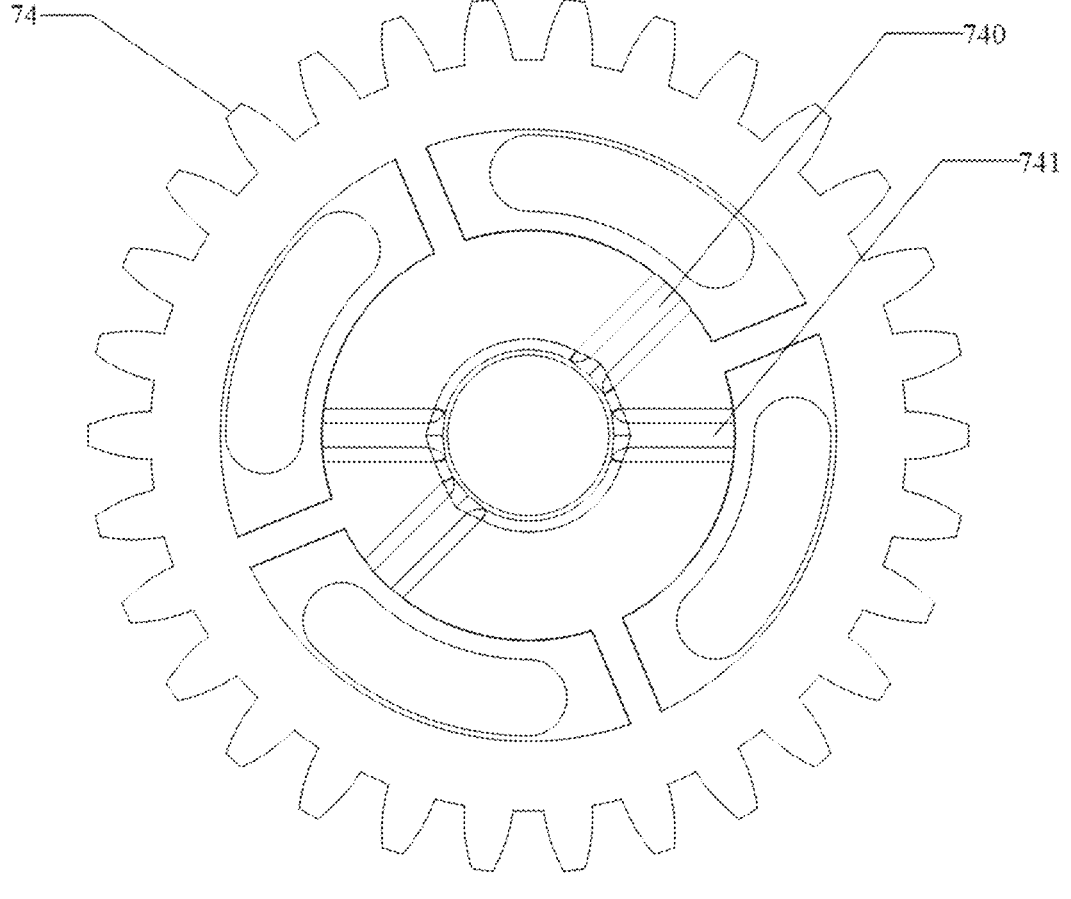

FIG. 13 is a schematic bottom structural diagram of the fifth gear of the fifth embodiment of the function button module with variable function layout.

Figure 14:
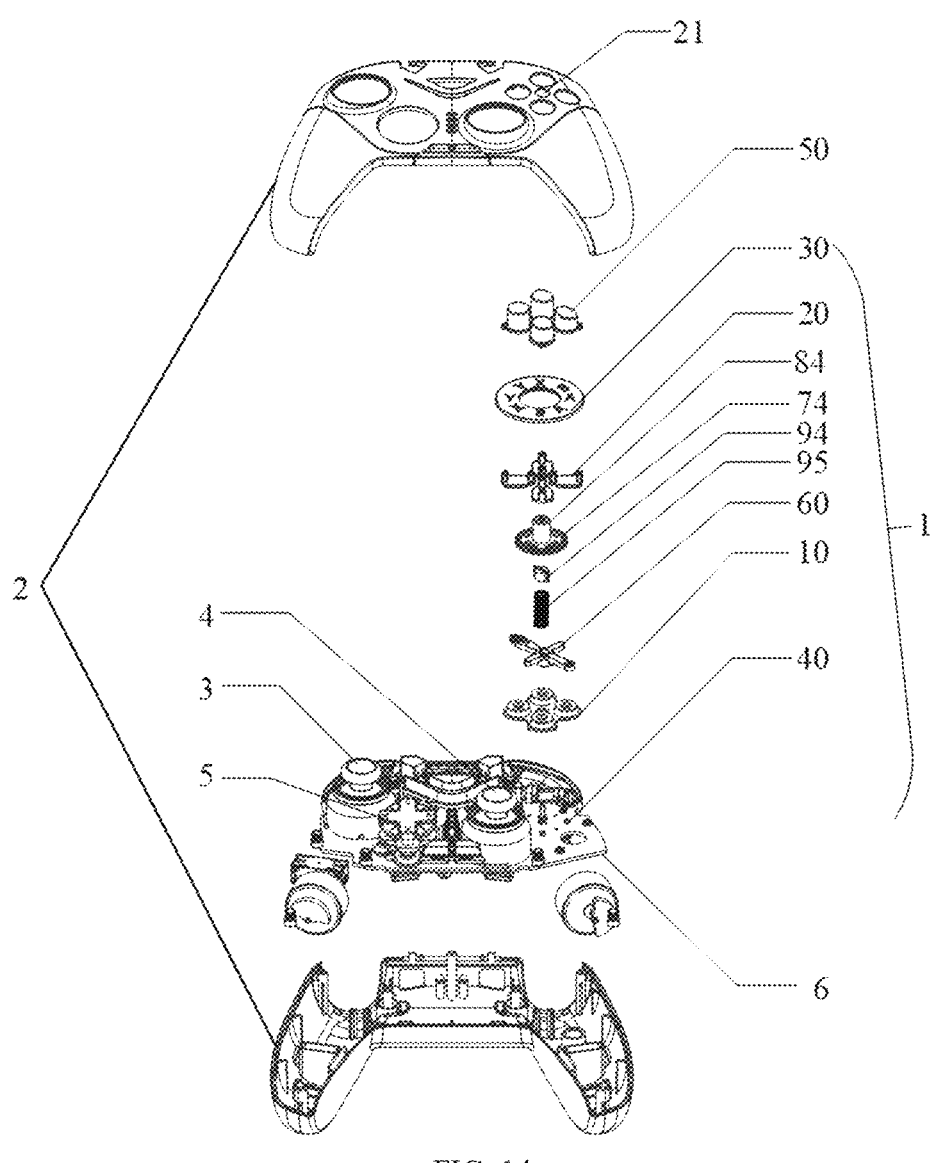

FIG. 14 is a schematic structural diagram of the fifth embodiment of the game controller.

REFERENCE NUMBER IN THE FIGURES

| | | | |
|---|---|---|---|
| function button module | 1 | casing | 2 |
| left joystick assembly | 3 | right joystick assembly | 4 |
| direction button assembly | 5 | circuit board | 6 |
| transparent pressing member | 10 | pressing parts | 100 |
| transparent supporting members | 20 | third through hole | 21 |
| support plate | 200 | support column | 201 |
| annular character changing plectrum | 30 | first through hole group | 300 |
| second through hole group | 301 | first gear teeth | 302 |
| indicator light | 40 | transparent buttons | 50 |
| plectrum support member | 60 | mounting hole | 600 |
| limiting grooves | 601 | motor switch | 70 |
| second gear | 71 | transmission gear set | 72 |
| first sub-gear | 720 | second sub-gear | 721 |
| fifth gear | 74 | third gear | 73 |
| second groove | 741 | first groove | 740 |
| first rotating shaft | 81 | motor assembly | 80 |
| rack | 82 | first groove body | 810 |
| toggle part | 821 | second gear teeth | 820 |
| fourth gear | 83 | second rotating shaft | 84 |
| first gear | 90 | knob part | 93 |
| limiting member | 94 | first limiting protrusions | 940 |
| elastic member | 95 | second limiting protrusion | 941 |

DETAILED DESCRIPTION

In order to make objectives, technical solutions, and advantages of the present disclosure clearer, the present disclosure is further described in details below with reference to accompanying drawings and embodiments. It should be understood that the specific embodiments described herein are merely used to explain the present disclosure, and are not intended to limit the present disclosure.

The present disclosure provides a function button module with variable function layout, the function button module with variable function layout, comprising: a transparent pressing member; a plurality of transparent supporting members; an annular character changing plectrum; a driving assembly; wherein the transparent pressing member includes a plurality of pressing parts distributed in an annular shape, and an indicator light is provided at the bottom of each pressing part; the plurality of transparent supporting members include a support plate and two support columns arranged at both ends of the support plate. The support plate is arranged on the top of the pressing part, and transparent buttons are provided on the two support columns; the annular character changing plectrum is movably arranged on the support plate, and is engaged between the two support columns of each transparent supporting member, so that the annular character changing plectrum rotates around the center of the plurality of support plates when driven; the annular character changing plectrum is provided with a first through hole group and a second through hole group corresponding to different function button layouts; the output part of the driving assembly is rotationally connected to the annular character changing plectrum, when the driving assembly is driven, the annular character changing plectrum is driven to rotate until each through hole of the first through hole group faces the bottom of each transparent button or each through hole of the second through hole group faces the bottom of each transparent button.

Specifically, when the driving assembly drives the annular character changing plectrum to rotate to each through hole of the first through hole group facing the bottom of each transparent button, the light emitted by the indicator light passes through the support plate of the transparent pressing member and the transparent supporting member in sequence, and then passes through each through hole of the first through hole group. Map the shape of the first through hole group to the transparent button, and users can confirm that the game controller is currently in a functional button layout by mapping the pattern on the transparent button. When the driving assembly drives the annular character changing plectrum to rotate to each through hole of the second through hole group facing the bottom of each transparent button, the light emitted by the indicator light passes through the support plate of the transparent pressing member and the transparent supporting member in sequence, and then passes through each through hole of the second through hole group. Map the shape of the second through hole group to the transparent button, and users can confirm that the game controller is currently in another functional button layout by mapping the pattern on the transparent button. Users can switch the function button layout of the game controller through the driver assembly to meet their usage needs.

In addition, the present disclosure also provides a game controller, comprising: the casing, the left joystick assembly, the right joystick assembly, the direction button assembly and the function button assembly; a circuit board is provided in the casing, and button holes are provided on the casing, the left joystick assembly, the right joystick assembly, the direction button assembly are arranged in corresponding button holes, wherein the function button assembly includes the function button module with variable functional layout of claim 1, the functional button module includes the indicator light, the transparent button, the transparent pressing member, the plurality of transparent supporting members, the annular character changing plectrum and the driving assembly, the indicator light is disposed at a preset function button position on the circuit board, and the transparent pressing member is disposed at the function button position, the transparent button is arranged in the button hole, the driving assembly is arranged in the casing, and a third through hole is provided on the casing, a driving part of the driving assembly extends from the third through hole to the outside of the casing; when the drive assembly is driven, the driving assembly drives the annular character changing plectrum to rotate until each through hole of the first through hole group faces the bottom of each transparent button or the second through hole group faces the bottom of each transparent button.

The function button module with variable function layout of the present invention sets the indicator light at the bottom of the transparent pressing member. Then the transparent supporting member is arranged on the transparent pressing member, and the transparent button is arranged on the support column of the transparent supporting member, so that there is a certain gap between the transparent button and the support plate of the transparent supporting member.

Then the annular character changing plectrum is movably arranged on the support plates of multiple transparent supporting members, and it is engaged between the two support columns of each transparent supporting member, so that the annular character changing plectrum rotates around the center of the plurality of support plates when driven, then set the first through hole group and the second through hole group on the annular character changing plectrum. The shapes of the first through hole group and the second through hole group are different, so that the first through hole group and the second through hole group respectively correspond to different function button layouts. Then use the driving assembly to rotate and connect with the annular character changing plectrum. When the driving assembly is driven, drive the annular character changing plectrum to rotate until each through hole in the first through hole group is facing the bottom of each transparent button or each through hole in the second through hole group is facing the bottom of each transparent button. Thereby, when the light emitted by the indicator light passes through the transparent pressing member, the transparent supporting member and the first through hole group in sequence, a pattern corresponding to the first function button layout can be mapped on the transparent button. When the light emitted by the indicator light passes through the transparent pressing member, the transparent supporting member and the second through hole group in sequence, a pattern corresponding to the second function button layout can be mapped on the transparent button, this allows users to obtain the layout information of function buttons through the patterns mapped on the transparent buttons, thereby enabling the game controller to adapt to different game requirements, meet user needs, and be more practical.

Figure 1:
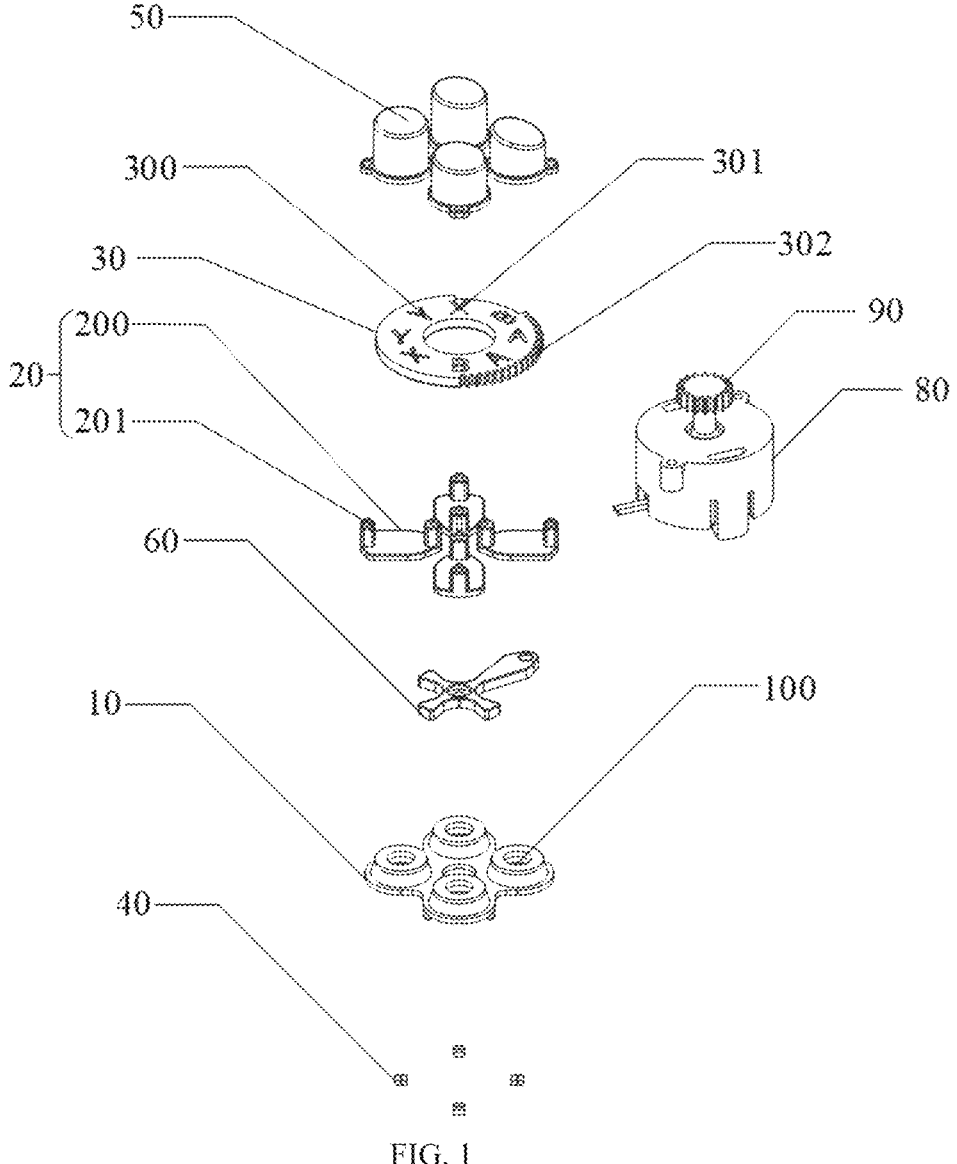
FIG. 1 is a schematic structural diagram of the first embodiment of the function button module with variable function layout.
Figure 3:
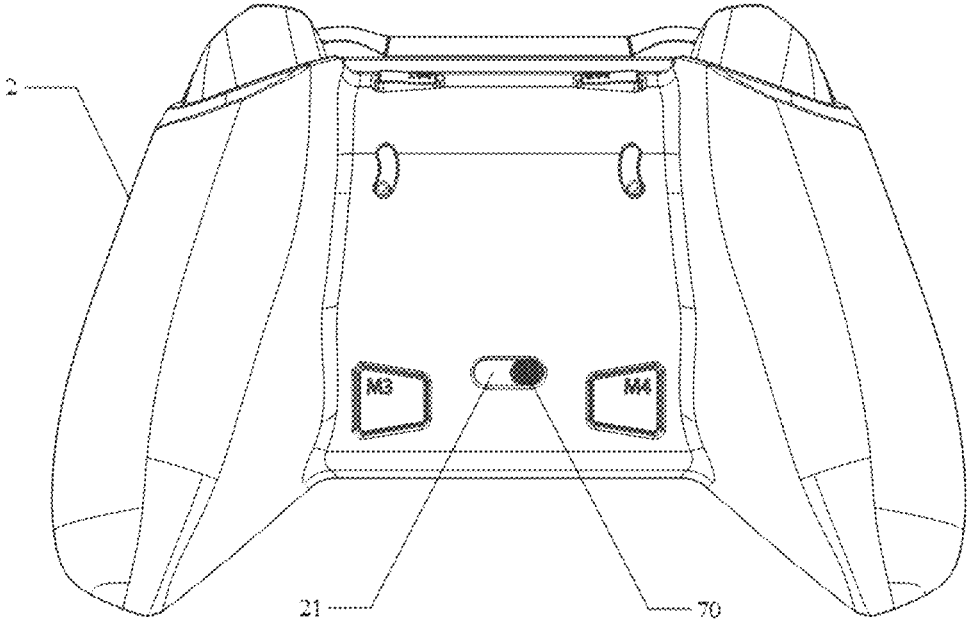
FIG. 3 is a schematic structural diagram of the back of the game controller according to the first embodiment of the present invention.

Referring to FIG. 1, FIG. 1 shows a schematic structural diagram of the first embodiment of the function button module with variable function layout. The function button module with variable function layout, comprising: the transparent pressing member 10; the plurality of transparent supporting members 20; the annular character changing plectrum 30; a motor switch 70 (refer to the FIG. 3), a motor assembly 80 and a first gear 90 disposed at the output end of the motor assembly 80.

Wherein the transparent pressing member 10 includes a plurality of pressing parts 100 distributed in an annular shape, and an indicator light 40 is provided at the bottom of each pressing part 100; the plurality of transparent supporting members 20 include a support plate 200 and two support columns 201 arranged at both ends of the support plate 200. The support plate 200 is arranged on the top of the pressing part 100, and transparent buttons 50 are provided on the two support columns 201. The annular character changing plectrum 30 is movably arranged on the support plate 200, and is engaged between the two support columns 201 of each transparent supporting member 20, so that the center of the annular character changing plectrum 30 coincides with the center of the multiple transparent supporting members 20, thereby, the annular character changing plectrum 30 rotates around the center of the plurality of support plates 200 when driven; and the annular part rotates between the two support columns 201 of each transparent supporting member 20, the annular character changing plectrum 30 is provided with a first through hole group 300 and a second through hole group 301 corresponding to different function button layouts; the outer edge of the annular character changing plectrum 30 is provided with first gear teeth 302. The first gear 90 meshes with the first gear teeth 302, and the motor switch 70 is electrically connected to the motor assembly 80.

When the motor switch 70 is turned on, the motor assembly 80 starts to work, and the motor assembly 80 drives the annular character changing plectrum 30 to rotate through the first gear 90. The annular character changing plectrum 30 is rotated until each through hole in the first through hole group 300 is facing the bottom of each transparent button 50 or each through hole in the second through hole group 301 is facing the bottom of each transparent button 50.

It should be noted that as shown in FIG. 1, the function button module 1 includes four function buttons, the transparent pressing member 10 includes four pressing parts 100, and the bottom of each pressing part 100 is equipped with an indicator light 40, each of pressing part 100 is equipped with an opening at the top, so that the light emitted by the indicator light 40 can directly shine on the support plate 200 of the transparent supporting member 20. The annular character changing plectrum 30 is equipped with the first through hole group 300 and the second through hole group 301. The first through hole group 300 and the second through hole group 301 both include through holes of four shapes: "X", "Y", "A", and "B", and the four through holes of the first through hole group 300 and the four through holes of the second through hole group 301 are staggered on the annular character changing plectrum 30. However, the layout of the four through holes "X", "Y", "A", and "B" is different between the first through hole group 300 and the second through hole group 301. In the first through hole group 300, the four through holes "A", "B", "Y", and "X" are sequentially distributed in an annular pattern. In the second through hole group 301, the four through holes "B", "A", "X", and "Y" are sequentially distributed in an annular pattern. Moreover, the through hole of the second through hole group 301 is tilted relative to the through-hole of the first through hole group 300, ensuring that the pattern projected onto the transparent button 50 will not be skewed after the annular character changing plectrum 30 rotates.

Furthermore, the function button module with variable function layout 1 further comprising a plectrum support member 60, the plectrum support member 60 is disposed at the gap between the plurality of transparent supporting members 20, the plectrum support member 60 is connected to the casing 2 of the game controller, and the top surface of the plectrum support member 60 and the top surface of the support plate 200 are on the same plane.

Specifically, the plurality of pressing parts 100 of the transparent pressing member 10 are arranged in an annular structure, the plurality of transparent supporting members 20 are arranged in an annular layout of the plurality of pressing parts 100, so that there are gaps between the plurality of transparent supporting members 20. The plectrum support member 60 is disposed in the gap, on the one hand, it does not take up more space; on the other hand, the plectrum support member 60 is used to connect with the housing of the game controller, thereby further supporting the annular character changing plectrum 30.

Furthermore, the indicator light 40 is a two-color indicator light 40. When the annular character changing plectrum 30 is rotated until each through hole of the first through hole group 300 is facing the bottom of each transparent button 50, the two-color indicator light 40 emits light of a first color, and when each through hole of the second through hole group 301 faces the bottom of each transparent button 50, the two-color indicator light 40 emits light of a second color.

Specifically, the display effect of the two-color indicator light 40 is preset, and when the layout of the function buttons is changed, the color of the light emitted by the two-color indicator light 40 is replaced simultaneously. Moreover, in order to further facilitate users to understand which button layout mode the game controller is currently in, in the same button layout mode, each button displays a different color. For example, for the XBOX controller button layout mode, the colors displayed by the indicator lights 40 are: the A button displays a green light, the B button displays a red light, the Y button displays an orange light, and the X button displays a blue light; when switching to the Switch controller button layout mode, the A button shows a red light, the B button shows a green light, the Y button shows a blue light, and the X button shows an orange light.

Figure 2:
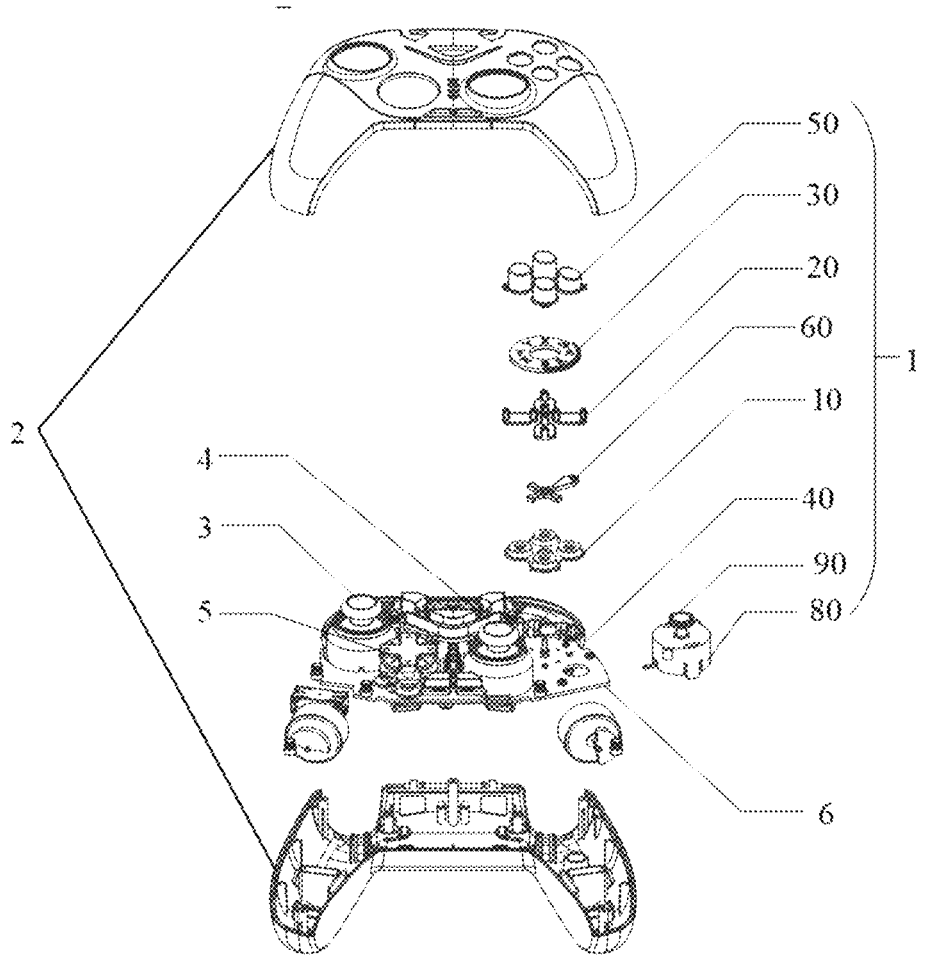
FIG. 2 is a schematic structural diagram of the first embodiment of the game controller.

Referring to FIG. 2, FIG. 2 shows a schematic structural diagram of the first embodiment of the game controller. The game controller, comprising: the casing 2, the left joystick assembly 3, the right joystick assembly 2, the direction button assembly 5 and the function button assembly; a circuit board 6 is provided in the casing 2, and button holes are provided on the casing 2, the left joystick assembly 3, the right joystick assembly 4, the direction button assembly 5 are arranged in corresponding button holes, wherein the function button assembly includes the function button module with variable functional layout of the first embodiment, the functional button module includes the indicator light 40, the transparent button 50, the transparent pressing member 10, the plurality of transparent supporting members 20, the annular character changing plectrum 30 and the driving assembly, the indicator light 40 is disposed at a preset function button position on the circuit board 6, and the transparent pressing member 10 is disposed at the function button position, the transparent button 50 is arranged in the button hole, the driving assembly is arranged in the casing 2, and a third through hole 21 is provided on the casing 2, a driving part of the driving assembly extends from the third through hole 21 to the outside of the casing 2; when the drive assembly is driven, the driving assembly drives the annular character changing plectrum 30 to rotate until each through hole of the first through hole group 300 faces the bottom of each transparent button 50 or the second through hole group 301 faces the bottom of each transparent button 50. Wherein the outer edge of the annular character changing plectrum 30 is provided with the first gear teeth 302, and the driving assembly includes the motor switch 70 (refer to the FIG. 3), the motor assembly 80 and the first gear 90 provided at the output end of the motor assembly 80. The first gear 90 meshes with the first gear teeth 302, and the motor switch 70 is electrically connected with the motor assembly 80, the motor assembly 80 is arranged in the casing 2, and the motor switch 70 extends from the third through hole 21 to the outside of the casing 2, when the motor switch 70 is turned on, the motor assembly 80 drives the annular character changing plectrum 30 to rotate through the first gear 90.

Figure 4:
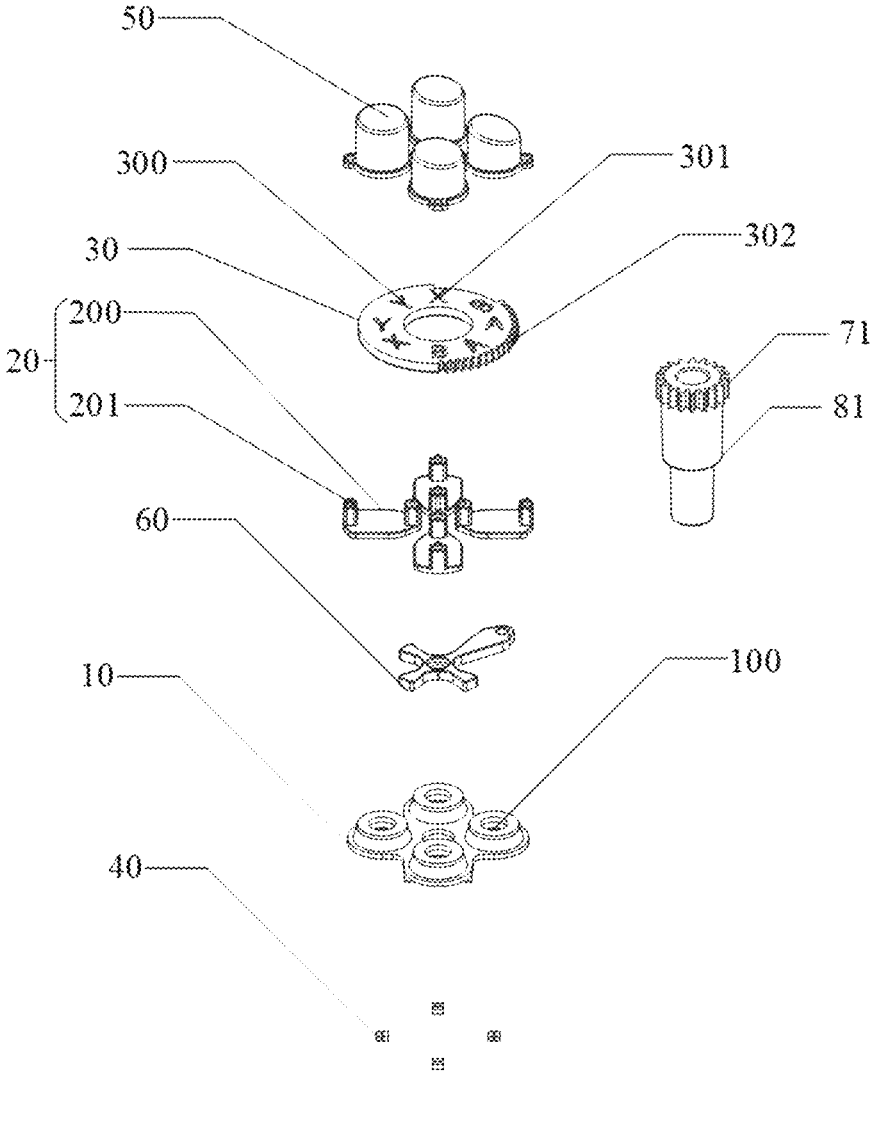
FIG. 4 is a schematic structural diagram of the second embodiment of the function button module with variable function layout.
Figure 6:
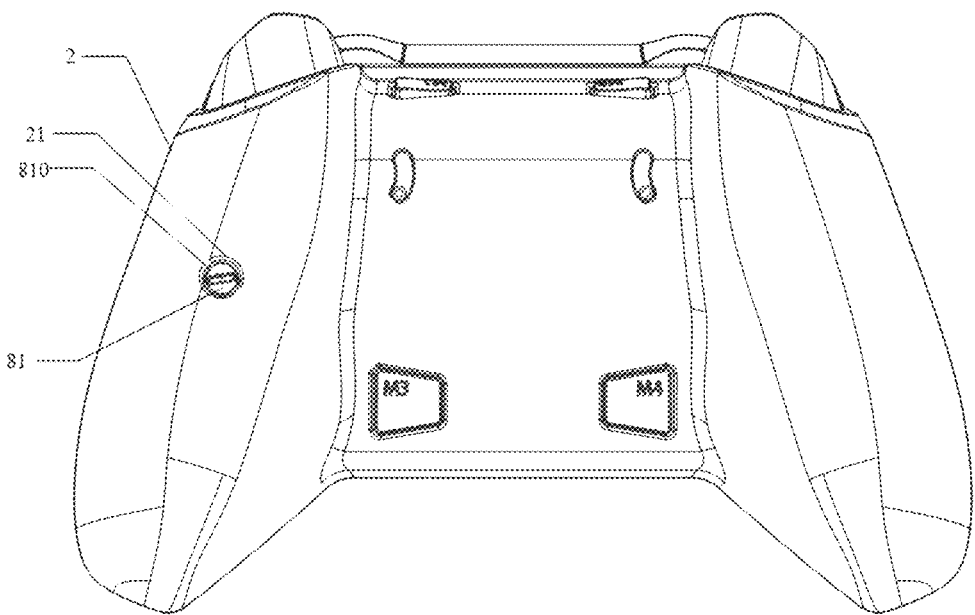
FIG. 6 is a schematic structural diagram of the back of the game controller according to the second embodiment of the present invention.

Referring to FIG. 4, FIG. 4 shows a schematic structural diagram of the second embodiment of the function button module with variable function layout. The function button module with variable function layout, comprising: the transparent pressing member 10; the plurality of transparent supporting members 20; the annular character changing plectrum 30; a second gear 71 and a first rotating shaft 81.

Wherein the transparent pressing member 10 includes a plurality of pressing parts 100 distributed in an annular shape, and an indicator light 40 is provided at the bottom of each pressing part 100; the plurality of transparent supporting members 20 include the support plate 200 and two support columns 201 arranged at both ends of the support plate 200. The support plate 200 is arranged on the top of the pressing part 100, and transparent buttons 50 are provided on the two support columns 201. The annular character changing plectrum 30 is movably arranged on the support plate 200, and is engaged between the two support columns 201 of each transparent supporting member 20, so that the center of the annular character changing plectrum 30 coincides with the center of the multiple transparent supporting members 20, thereby, the annular character changing plectrum 30 rotates around the center of the plurality of support plates 200 when driven; and the annular part rotates between the two support columns 201 of each transparent supporting member 20, the annular character changing plectrum 30 is provided with a first through hole group 300 and a second through hole group 301 corresponding to different function button layouts; the outer edge of the annular character changing plectrum 30 is provided with first gear teeth 302. The second gear 71 meshes with the first gear teeth 302, the top end of the first rotating shaft 81 is fixedly connected to the second gear 71, and the bottom end of the first rotating shaft 81 is provided with a first groove body 810 (referring to the FIG. 6), when the first rotating shaft 81 is rotated, the second gear 71 drives the annular character changing plectrum 30 to rotate. Rotate the annular character changing plectrum 30 until each through hole of the first through hole group 300 faces the bottom of each transparent button 50 or the second through hole group 301 faces the bottom of each transparent button 50.

Specifically, the first groove body 810 can be a "one" or "cross" groove, and the first rotating shaft 81 can be rotated using a one or cross screwdriver, thereby driving the second gear 71 to rotate, and the second gear 71 drives the annular word changing paddle 30 to rotate.

It should be noted that as shown in FIG. 4, the function button module 1 includes four function buttons, the transparent pressing member 10 includes four pressing parts 100, and the bottom of each pressing part 100 is equipped with an indicator light 40, each of pressing part 100 is equipped with an opening at the top, so that the light emitted by the indicator light 40 can directly shine on the support plate 200 of the transparent supporting member 20. The annular character changing plectrum 30 is equipped with the first through hole group 300 and the second through hole group 301. The first through hole group 300 and the second through hole group 301 both include through holes of four shapes: "X", "Y", "A", and "B", and the four through holes of the first through hole group 300 and the four through holes of the second through hole group 301 are staggered on the annular character changing plectrum 30. However, the layout of the four through holes "X", "Y", "A", and "B" is different between the first through hole group 300 and the second through hole group 301. In the first through hole group 300, the four through holes "A", "B", "Y", and "X" are sequentially distributed in an annular pattern. In the second through hole group 301, the four through holes "B", "A", "X", and "Y" are sequentially distributed in an annular pattern. Moreover, the through hole of the second through hole group 301 is tilted relative to the through hole of the first through hole group 300, ensuring that the pattern projected onto the transparent button 50 will not be skewed after the annular character changing plectrum 30 rotates.

Furthermore, the function button module 1 with variable function layout further comprising a plectrum support member 60, the plectrum support member 60 is disposed at the gap between the plurality of transparent supporting members 20, the plectrum support member 60 is connected to the casing 2 of the game controller, and the top surface of the plectrum support member 60 and the top surface of the support plate 200 are on the same plane.

Specifically, the plurality of pressing parts 100 of the transparent pressing member 10 are arranged in an annular structure, the plurality of transparent supporting members 20 are arranged in an annular layout of the plurality of pressing parts 100, so that there are gaps between the plurality of transparent supporting members 20. The plectrum support member 60 is disposed in the gap, on the one hand, it does not take up more space; on the other hand, the plectrum support member 60 is used to connect with the housing of the game controller, thereby further supporting the annular character changing plectrum 30.

Furthermore, the indicator light 40 is a two-color indicator light 40. When the annular character changing plectrum 30 is rotated until each through hole of the first through hole group 300 is facing the bottom of each transparent button 50, the two-color indicator light 40 emits light of a first color, and when each through hole of the second through hole group 301 faces the bottom of each transparent button 50, the two-color indicator light 40 emits light of a second color.

Specifically, the display effect of the two-color indicator light 40 is preset, and when the layout of the function buttons is changed, the color of the light emitted by the two-color indicator light 40 is replaced simultaneously. Moreover, in order to further facilitate users to understand which button layout mode the game controller is currently in, in the same button layout mode, each button displays a different color. For example, for the XBOX controller button layout mode, the colors displayed by the indicator lights 40 are: the A button displays a green light, the B button displays a red light, the Y button displays an orange light, and the X button displays a blue light; when switching to the Switch controller button layout mode, the A button shows a red light, the B button shows a green light, the Y button shows a blue light, and the X button shows an orange light.

Figure 5:
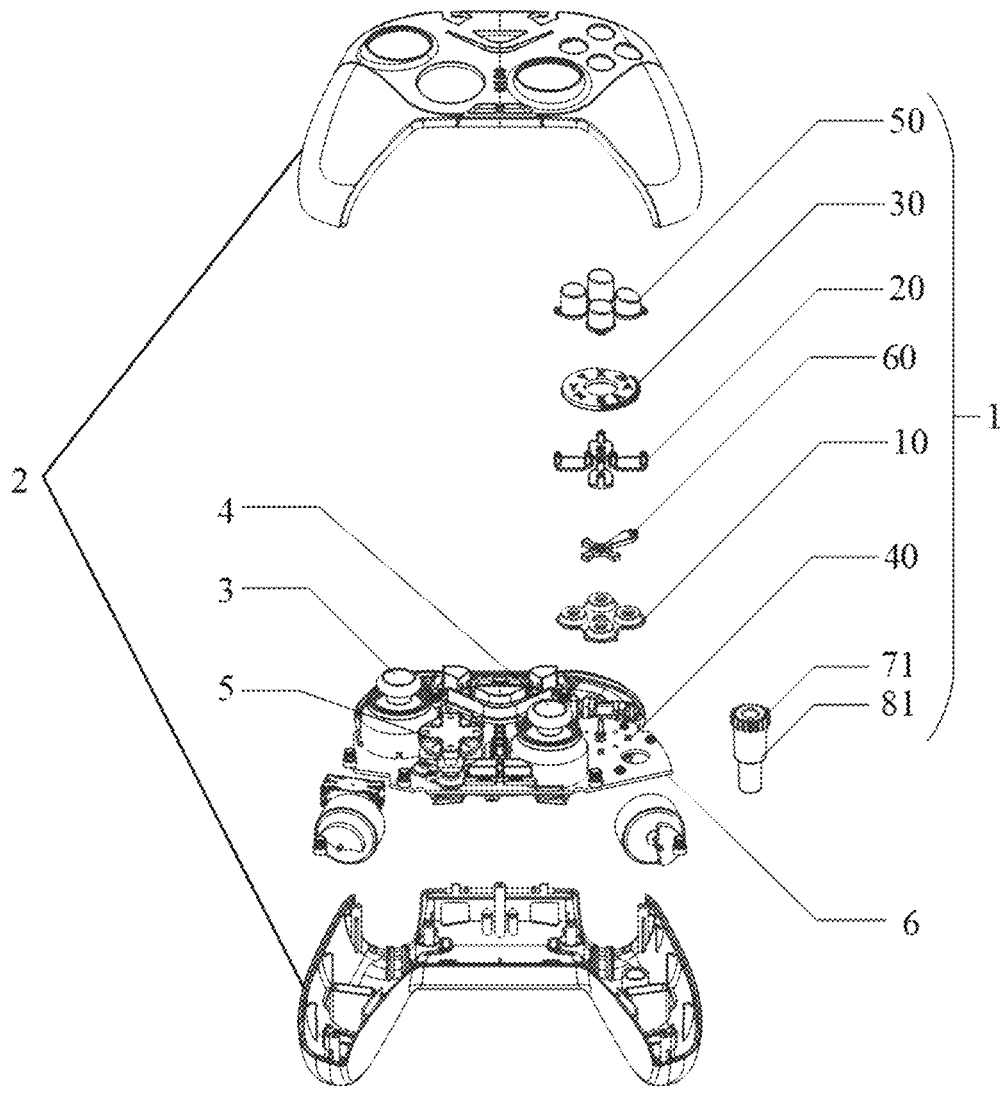
FIG. 5 is a schematic structural diagram of the second embodiment of the game controller.

Referring to FIG. 5, FIG. 5 shows a schematic structural diagram of the second embodiment of the game controller. The game controller, comprising: the casing 2, the left joystick assembly 3, the right joystick assembly 2, the direction button assembly 5 and the function button assembly; a circuit board 6 is provided in the casing 2, and button holes are provided on the casing 2, the left joystick assembly 3, the right joystick assembly 4, the direction button assembly 5 are arranged in corresponding button holes, wherein the function button assembly includes the function button module with variable functional layout of the second embodiment, the functional button module includes the indicator light 40, the transparent button 50, the transparent pressing member 10, the plurality of transparent supporting members 20, the annular character changing plectrum 30 and the driving assembly, the indicator light 40 is disposed at a preset function button position on the circuit board 6, and the transparent pressing member 10 is disposed at the function button position, the transparent button 50 is arranged in the button hole, the driving assembly is arranged in the casing 2, and a third through hole 21 is provided on the casing 2 (referring to the FIG. 6), the driving part of the driving assembly extends from the third through hole 21 to the outside of the casing 2; when the drive assembly is driven, the driving assembly drives the annular character changing plectrum 30 to rotate until each through hole of the first through hole group 300 faces the bottom of each transparent button 50 or the second through hole group 301 faces the bottom of each transparent button 50. Wherein the outer edge of the annular character changing plectrum 30 is provided with the first gear teeth 302, and the second gear 71 meshes with the first gear teeth 302, the top end of the first rotating shaft 81 is fixedly connected to the second gear 71, and the third through hole 21 is provided on the bottom surface of the casing 2, and the bottom end of the first rotating shaft 81 is provided with a first groove body 810 (referring to the FIG. 6), when the first rotating shaft 81 is rotated, the second gear 71 drives the annular character changing plectrum 30 to rotate.

Figure 7:
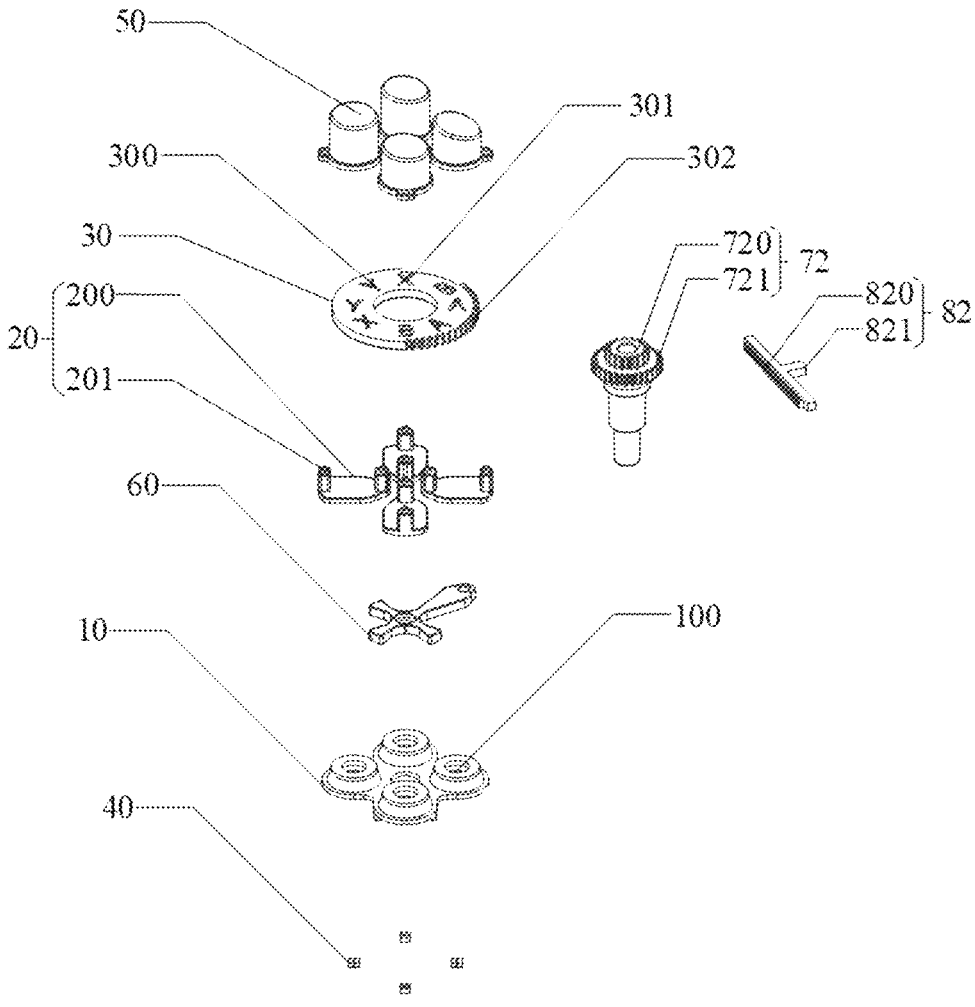
FIG. 7 is a schematic structural diagram of the third embodiment of the function button module with variable function layout.

Referring to FIG. 7, FIG. 7 shows a schematic structural diagram of the third embodiment of the function button module with variable function layout. The function button module with variable function layout, comprising: the transparent pressing member 10; the plurality of transparent supporting members 20; the annular character changing plectrum 30; a transmission gear set 72 and a rack 82.

Wherein the transparent pressing member 10 includes a plurality of pressing parts 100 distributed in an annular shape, and an indicator light 40 is provided at the bottom of each pressing part 100; the plurality of transparent supporting members 20 include the support plate 200 and two support columns 201 arranged at both ends of the support plate 200. The support plate 200 is arranged on the top of the pressing part 100, and transparent buttons 50 are provided on the two support columns 201. The annular character changing plectrum 30 is movably arranged on the support plate 200, and is engaged between the two support columns 201 of each transparent supporting member 20, so that the center of the annular character changing plectrum 30 coincides with the center of the multiple transparent supporting members 20, thereby, the annular character changing plectrum 30 rotates around the center of the plurality of support plates 200 when driven; and the annular part rotates between the two support columns 201 of each transparent supporting member 20, the annular character changing plectrum 30 is provided with a first through hole group 300 and a second through hole group 301 corresponding to different function button layouts; the outer edge of the annular character changing plectrum 30 is provided with first gear teeth 302. A second gear teeth 820 and a toggle part 821 are respectively provided on both sides of the rack 82, and the transmission gear set 72 meshes with the first gear teeth 302 and the second gear teeth 820 respectively; when the toggle part 821 is toggled, the annular character changing plectrum 30 is driven to rotate through the transmission gear set 72. Rotate the annular character changing plectrum 30 until each through hole of the first through hole group 300 faces the bottom of each transparent button 50 or the second through hole group 301 faces the bottom of each transparent button 50.

It should be noted that as shown in FIG. 7, the function button module 1 includes four function buttons, the transparent pressing member 10 includes four pressing parts 100, and the bottom of each pressing part 100 is equipped with an indicator light 40, each of pressing part 100 is equipped with an opening at the top, so that the light emitted by the indicator light 40 can directly shine on the support plate 200 of the transparent supporting member 20. The annular character changing plectrum 30 is equipped with the first through hole group 300 and the second through hole group 301. The first through hole group 300 and the second through hole group 301 both include through holes of four shapes: "X", "Y", "A", and "B", and the four through holes of the first through hole group 300 and the four through holes of the second through hole group 301 are staggered on the annular character changing plectrum 30. However, the layout of the four through holes "X", "Y", "A", and "B" is different between the first through hole group 300 and the second through hole group 301. In the first through hole group 300, the four through holes "A", "B", "Y", and "X"

are sequentially distributed in an annular pattern. In the second through hole group 301, the four through holes "B", "A", "X", and "Y" are sequentially distributed in an annular pattern. Moreover, the through hole of the second through hole group 301 is tilted relative to the through hole of the first through hole group 300, ensuring that the pattern projected onto the transparent button 50 will not be skewed after the annular character changing plectrum 30 rotates.

Specifically, the transmission gear set 72 includes a first sub-gear 720 and a second sub-gear 721. The middle portions of the first sub-gear 720 and the second sub-gear 721 are fixedly connected. The first sub-gear 720 meshes with the first gear teeth 302, and the second sub-gear 721 meshes with the second gear teeth 820, so that a primary and secondary gear structure is formed between the rack 82, the transmission gear set 72 and the annular character changing plectrum 30, this enables the toggle part 821 on the rack 82 to drive the annular character changing plectrum 30 to rotate to a specified angle faster.

Furthermore, the function button module 1 with variable function layout further comprising the plectrum support member 60, the plectrum support member 60 is disposed at the gap between the plurality of transparent supporting members 20, the plectrum support member 60 is connected to the casing 2 of the game controller, and the top surface of the plectrum support member 60 and the top surface of the support plate 200 are on the same plane.

Specifically, the plurality of pressing parts 100 of the transparent pressing member 10 are arranged in an annular structure, the plurality of transparent supporting members 20 are arranged in an annular layout of the plurality of pressing parts 100, so that there are gaps between the plurality of transparent supporting members 20. The plectrum support member 60 is disposed in the gap, on the one hand, it does not take up more space; on the other hand, the plectrum support member 60 is used to connect with the housing of the game controller, thereby further supporting the annular character changing plectrum 30.

Furthermore, the indicator light 40 is a two-color indicator light 40. When the annular character changing plectrum 30 is rotated until each through hole of the first through hole group 300 is facing the bottom of each transparent button 50, the two-color indicator light 40 emits light of a first color, and when each through hole of the second through hole group 301 faces the bottom of each transparent button 50, the two-color indicator light 40 emits light of a second color.

Specifically, the display effect of the two-color indicator light 40 is preset, and when the layout of the function buttons is changed, the color of the light emitted by the two-color indicator light 40 is replaced simultaneously. Moreover, in order to further facilitate users to understand which button layout mode the game controller is currently in, in the same button layout mode, each button displays a different color. For example, for the XBOX controller button layout mode, the colors displayed by the indicator lights 40 are: the A button displays a green light, the B button displays a red light, the Y button displays an orange light, and the X button displays a blue light; when switching to the Switch controller button layout mode, the A button shows a red light, the B button shows a green light, the Y button shows a blue light, and the X button shows an orange light.

Figure 8:
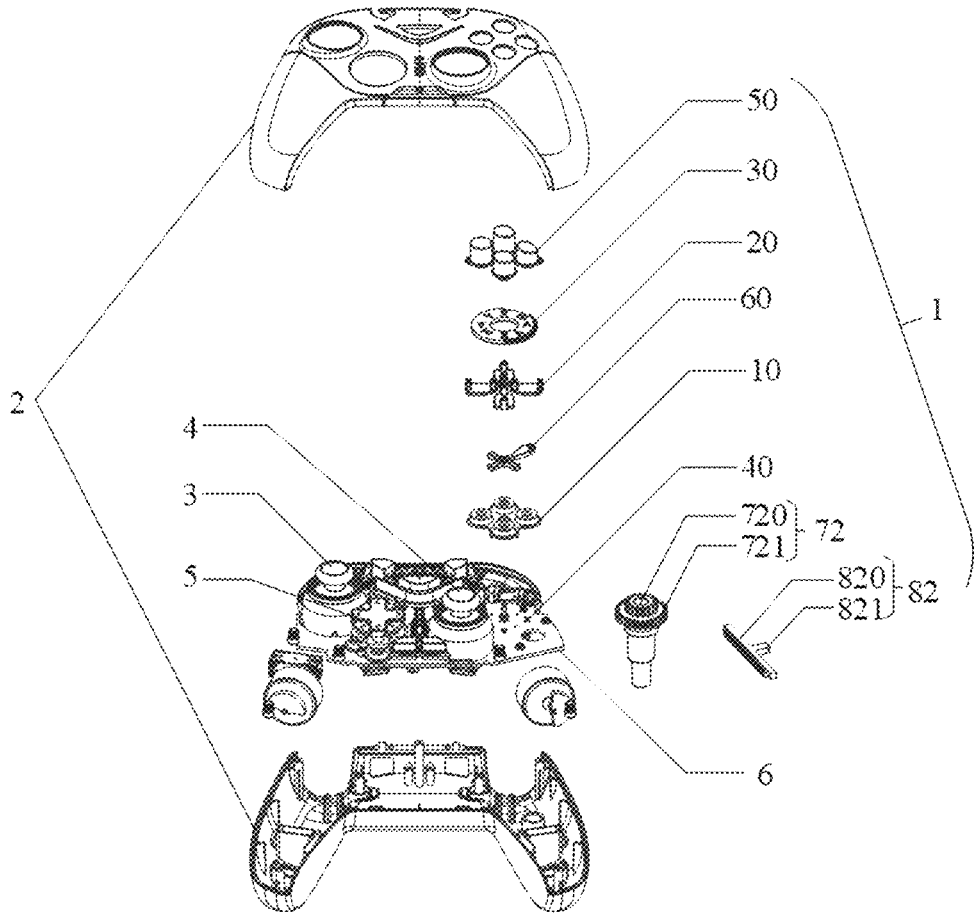
FIG. 8 is a schematic structural diagram of the third embodiment of the game controller.

Referring to FIG. 8, FIG. 8 shows a schematic structural diagram of the third embodiment of the game controller. The game controller, comprising: the casing 2, the left joystick assembly 3, the right joystick assembly 2, the direction button assembly 5 and the function button assembly; a circuit board 6 is provided in the casing 2, and button holes are provided on the casing 2, the left joystick assembly 3, the right joystick assembly 4, the direction button assembly 5 are arranged in corresponding button holes, wherein the function button assembly includes the function button module with variable functional layout of the third embodiment, the functional button module includes the indicator light 40, the transparent button 50, the transparent pressing member 10, the plurality of transparent supporting members 20, the annular character changing plectrum 30 and the driving assembly, the indicator light 40 is disposed at a preset function button position on the circuit board 6, and the transparent pressing member 10 is disposed at the function button position, the transparent button 50 is arranged in the button hole, the driving assembly is arranged in the casing 2, and a third through hole 21 is provided on the casing 2 (Not shown in the figure), the driving part of the driving assembly extends from the third through hole 21 to the outside of the casing 2; when the drive assembly is driven, the driving assembly drives the annular character changing plectrum 30 to rotate until each through hole of the first through hole group 300 faces the bottom of each transparent button 50 or the second through hole group 301 faces the bottom of each transparent button 50. Wherein the outer edge of the annular character changing plectrum 30 is provided with the first gear teeth 302, the driving assembly includes the transmission gear set 72 and the rack 82; the second gear teeth 820 and the toggle part 821 are respectively provided on both sides of the rack 82, the casing 2 is provided with the support column 201, and the transmission gear set 72 is movably provided on the support column 201. The transmission gear set 72 meshes with the first gear teeth 302 and the second gear teeth 820 respectively. The toggle part 821 extends to the outside of the casing 2 through the third through hole. When the toggle part 821 is dialed, the annular character changing plectrum 30 is driven to rotate through the transmission gear set 72.

Figure 9:
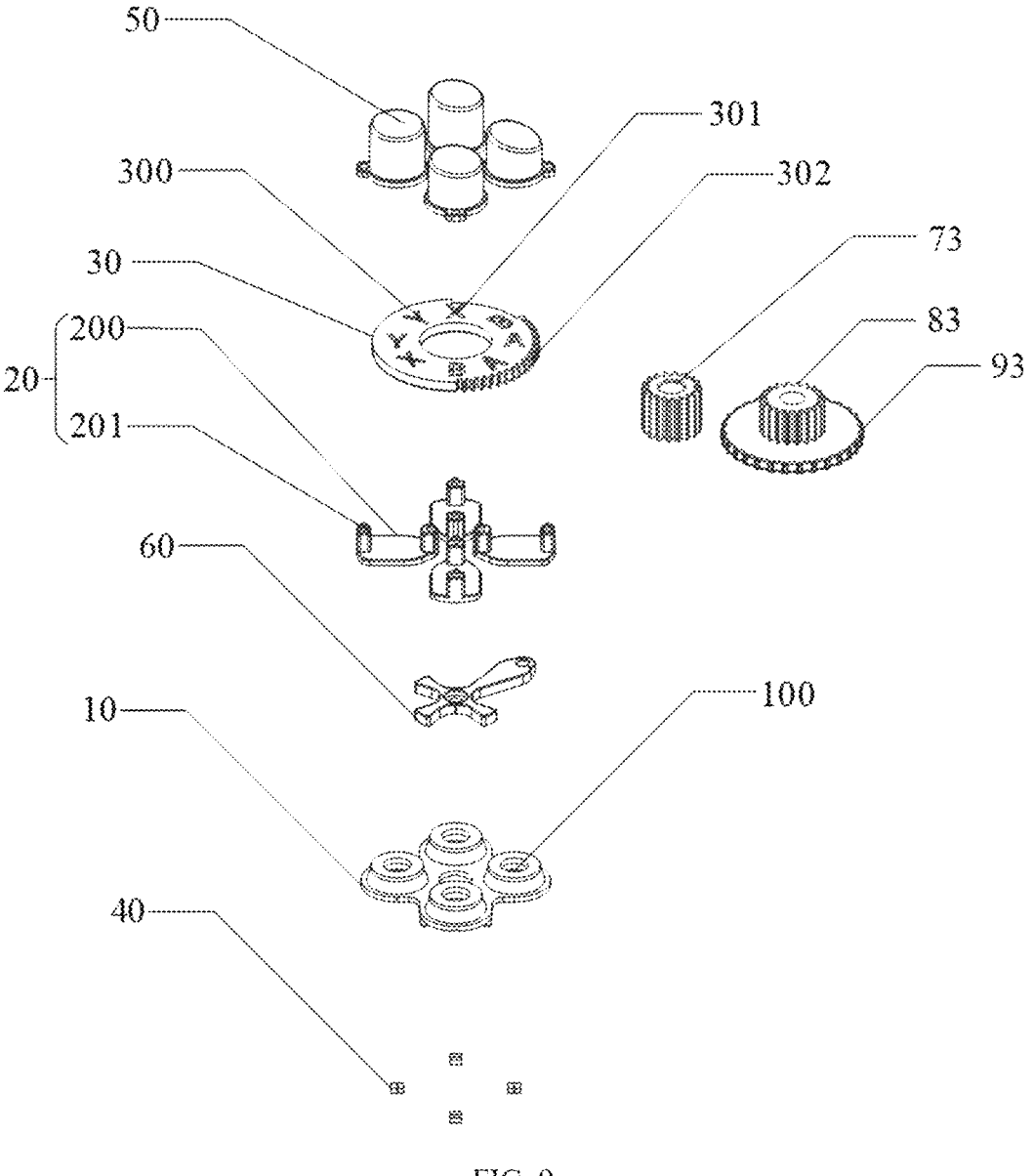
FIG. 9 is a schematic structural diagram of the fourth embodiment of the function button module with variable function layout.

Referring to FIG. 9, FIG. 9 shows a schematic structural diagram of the fourth embodiment of the function button module with variable function layout. The function button module with variable function layout, comprising: the transparent pressing member 10; the plurality of transparent supporting members 20; the annular character changing plectrum 30; a third gear 73, a fourth gear 83 and a knob part 93.

Wherein the transparent pressing member 10 includes a plurality of pressing parts 100 distributed in an annular shape, and an indicator light 40 is provided at the bottom of each pressing part 100; the plurality of transparent supporting members 20 include the support plate 200 and two support columns 201 arranged at both ends of the support plate 200. The support plate 200 is arranged on the top of the pressing part 100, and transparent buttons 50 are provided on the two support columns 201. The annular character changing plectrum 30 is movably arranged on the support plate 200, and is engaged between the two support columns 201 of each transparent supporting member 20, so that the center of the annular character changing plectrum 30 coincides with the center of the multiple transparent supporting members 20, thereby, the annular character changing plectrum 30 rotates around the center of the plurality of support plates 200 when driven; and the annular part rotates between the two support columns 201 of each transparent supporting member 20, the annular character changing plectrum 30 is provided with a first through hole group 300 and a second through hole group 301 corresponding to different function button layouts; the outer edge of the annular character changing plectrum 30 is provided with first gear teeth 302.

The center of the knob part 93 is connected to the center of the fourth gear 83, and the third gear 73 meshes with the first gear teeth 302 and the fourth gear 83 respectively, when the knob part 93 is rotated, the fourth gear 83 drives the annular character changing plectrum 30 to rotate through the third gear 73. Rotate the annular character changing plectrum 30 until each through hole of the first through hole group 300 faces the bottom of each transparent button 50 or the second through hole group 301 faces the bottom of each transparent button 50.

It should be noted that as shown in FIG. 9, the function button module 1 includes four function buttons, the transparent pressing member 10 includes four pressing parts 100, and the bottom of each pressing part 100 is equipped with an indicator light 40, each of pressing part 100 is equipped with an opening at the top, so that the light emitted by the indicator light 40 can directly shine on the support plate 200 of the transparent supporting member 20. The annular character changing plectrum 30 is equipped with the first through hole group 300 and the second through hole group 301. The first through hole group 300 and the second through hole group 301 both include through holes of four shapes: "X", "Y", "A", and "B", and the four through holes of the first through hole group 300 and the four through holes of the second through hole group 301 are staggered on the annular character changing plectrum 30. However, the layout of the four through holes "X", "Y", "A", and "B" is different between the first through hole group 300 and the second through hole group 301. In the first through hole group 300, the four through holes "A", "B", "Y", and "X" are sequentially distributed in an annular pattern. In the second through hole group 301, the four through holes "B", "A", "X", and "Y" are sequentially distributed in an annular pattern. Moreover, the through hole of the second through hole group 301 is tilted relative to the through hole of the first through hole group 300, ensuring that the pattern projected onto the transparent button 50 will not be skewed after the annular character changing plectrum 30 rotates.

Furthermore, the function button module 1 with variable function layout further comprising the plectrum support member 60, the plectrum support member 60 is disposed at the gap between the plurality of transparent supporting members 20, the plectrum support member 60 is connected to the casing 2 of the game controller, and the top surface of the plectrum support member 60 and the top surface of the support plate 200 are on the same plane.

Specifically, the plurality of pressing parts 100 of the transparent pressing member 10 are arranged in an annular structure, the plurality of transparent supporting members 20 are arranged in an annular layout of the plurality of pressing parts 100, so that there are gaps between the plurality of transparent supporting members 20. The plectrum support member 60 is disposed in the gap, on the one hand, it does not take up more space; on the other hand, the plectrum support member 60 is used to connect with the housing of the game controller, thereby further supporting the annular character changing plectrum 30.

Furthermore, the indicator light 40 is a two-color indicator light 40. When the annular character changing plectrum 30 is rotated until each through hole of the first through hole group 300 is facing the bottom of each transparent button 50, the two-color indicator light 40 emits light of a first color, and when each through hole of the second through hole group 301 faces the bottom of each transparent button 50, the two-color indicator light 40 emits light of a second color.

Specifically, the display effect of the two-color indicator light 40 is preset, and when the layout of the function buttons is changed, the color of the light emitted by the two-color indicator light 40 is replaced simultaneously. Moreover, in order to further facilitate users to understand which button layout mode the game controller is currently in, in the same button layout mode, each button displays a different color. For example, for the XBOX controller button layout mode, the colors displayed by the indicator lights 40 are: the A button displays a green light, the B button displays a red light, the Y button displays an orange light, and the X button displays a blue light; when switching to the Switch controller button layout mode, the A button shows a red light, the B button shows a green light, the Y button shows a blue light, and the X button shows an orange light.

Figure 10:
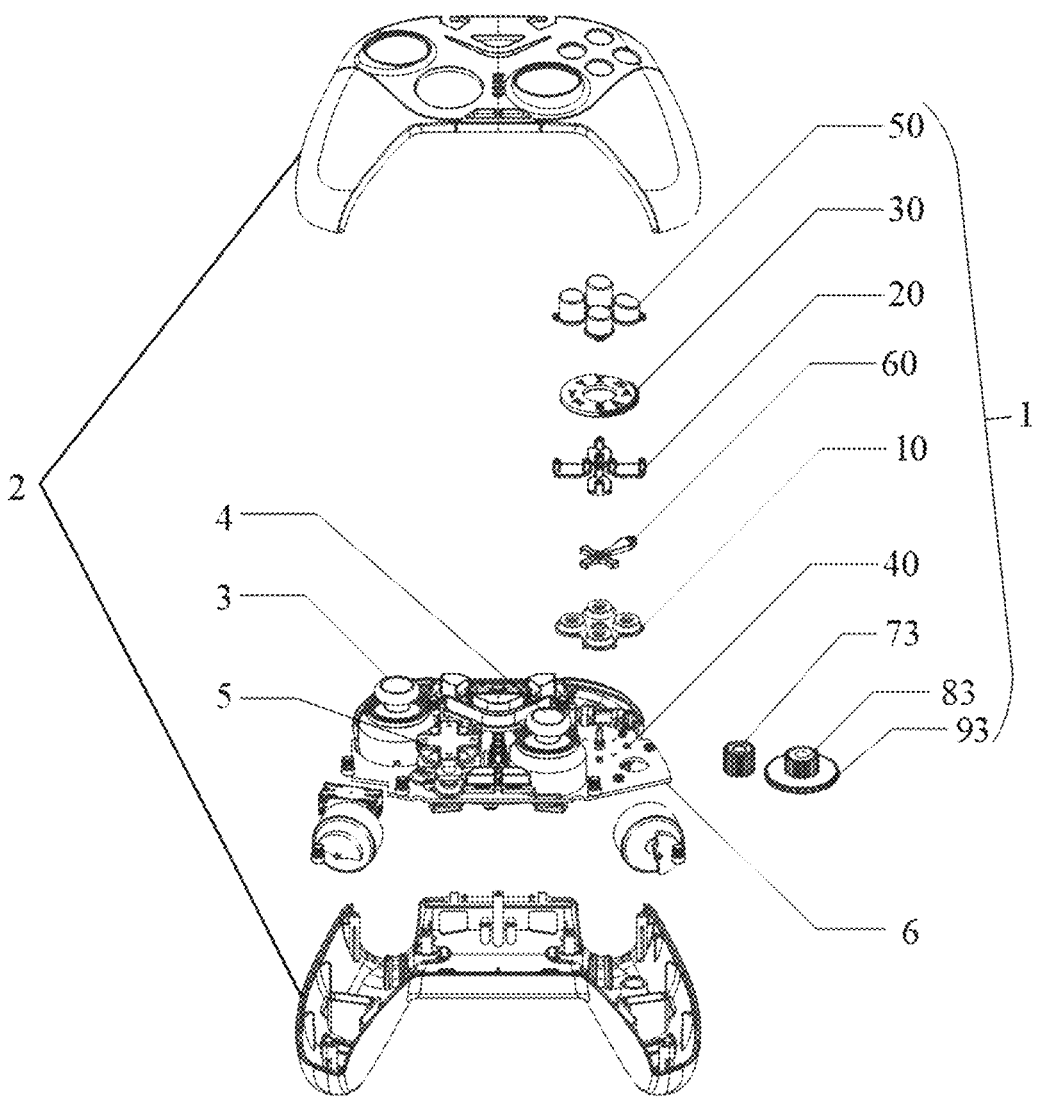
FIG. 10 is a schematic structural diagram of the fourth embodiment of the game controller.

Referring to FIG. 10, FIG. 10 shows a schematic structural diagram of the fourth embodiment of the game controller. The game controller, comprising: the casing 2, the left joystick assembly 3, the right joystick assembly 2, the direction button assembly 5 and the function button assembly; a circuit board 6 is provided in the casing 2, and button holes are provided on the casing 2, the left joystick assembly 3, the right joystick assembly 4, the direction button assembly 5 are arranged in corresponding button holes, wherein the function button assembly includes the function button module with variable functional layout of the fourth embodiment, the functional button module includes the indicator light 40, the transparent button 50, the transparent pressing member 10, the plurality of transparent supporting members 20, the annular character changing plectrum 30 and the driving assembly, the indicator light 40 is disposed at a preset function button position on the circuit board 6, and the transparent pressing member 10 is disposed at the function button position, the transparent button 50 is arranged in the button hole, the driving assembly is arranged in the casing 2, and a third through hole 21 is provided on the casing 2 (Not shown in the figure), the driving part of the driving assembly extends from the third through hole 21 to the outside of the casing 2; when the drive assembly is driven, the driving assembly drives the annular character changing plectrum 30 to rotate until each through hole of the first through hole group 300 faces the bottom of each transparent button 50 or the second through hole group 301 faces the bottom of each transparent button 50. Wherein the outer edge of the annular character changing plectrum 30 is provided with the first gear teeth 302, and the driving assembly includes the third gear 73, the fourth gear 83 and the knob part 93, the center of the knob part 93 is connected to the center of the fourth gear 83, and the third gear 73 meshes with the first gear teeth 302 and the fourth gear 83 respectively, when the knob part 93 is rotated, the fourth gear 83 drives the annular character changing plectrum 30 to rotate through the third gear 73.

Referring to FIG. 11, FIG. 11 shows a schematic structural diagram of the fifth embodiment of the function button module with variable function layout. The function button module with variable function layout, comprising: the transparent pressing member 10; the plurality of transparent supporting members 20; the annular character changing plectrum 30; a fifth gear 74 and a second rotating shaft 84.

Wherein the transparent pressing member 10 includes a plurality of pressing parts 100 distributed in an annular shape, and an indicator light 40 is provided at the bottom of each pressing part 100; the plurality of transparent supporting members 20 include the support plate 200 and two support columns 201 arranged at both ends of the support plate 200. The support plate 200 is arranged on the top of the pressing part 100, and transparent buttons 50 are provided on the two support columns 201. The annular character changing plectrum 30 is movably arranged on the support plate 200, and is engaged between the two support columns 201 of each transparent supporting member 20, so that the center of the annular character changing plectrum 30 coincides with the center of the multiple transparent supporting members 20, thereby, the annular character changing plectrum 30 rotates around the center of the plurality of support plates 200 when driven; and the annular part rotates between the two support columns 201 of each transparent supporting member 20, the annular character changing plectrum 30 is provided with the first through hole group 300 and the second through hole group 301 corresponding to different function button layouts; the outer edge of the annular character changing plectrum 30 is provided with first gear teeth 302. The fifth gear meshes 74 with the first gear teeth 302, the bottom end of the second rotating shaft 84 is fixedly connected to the fifth gear 74, and the top end of the second rotating shaft 84 is provided with a second groove body, when the second rotating shaft 84 is rotated, the fifth gear 74 drives the annular character changing plectrum 30 to rotate.

Specifically, the second groove body can be a "one" or "cross" groove, and the first rotating shaft 81 can be rotated using a one or cross screwdriver, thereby driving the fifth gear 74 to rotate, and the fifth gear 74 drives the annular word changing paddle 30 to rotate.

Furthermore, in this embodiment, please refer to FIGS. 11, 12, and 13, the driving assembly also includes a limiting member 94 and an elastic member 95, the middle part of the plectrum support member 60 is directly opposite to the annular character changing plectrum 30, and the middle part of the plectrum support member 60 is provided with a mounting hole 600; limiting grooves 601 are provided on both sides of the mounting hole 600, and the diameter of the limiting member 94 matches the diameter of the mounting hole 600; first limiting protrusions 940 are provided on both sides of the limiting member 94, and the first limiting protrusions 940 are arranged in the limiting grooves 601, the elastic member 95 is provided between the bottom of the limiting member 94 and the bottom of the mounting hole 600, and the bottom surface of the fifth gear 74 is provided with a first groove 740 and a second groove 741, the top surface of the limiting member 94 is provided with a second limiting protrusion 941, when the second rotating shaft 84 is rotated, the fifth gear 74 drives the annular character changing plectrum 30 to rotate, when the annular character changing plectrum 30 is rotated until each through hole of the first through hole group 300 is facing the bottom of each transparent button 50 or each through hole of the second through hole group 300 is facing the bottom of each transparent button 50, the second limiting protrusion 941 is locked into the first groove 740 or the second groove 741.

It should be noted that the surface of the second limiting protrusion 941 is designed in an arc shape. Similarly, the groove surfaces of the first groove 740 and the second groove 741 are also designed in an arc shape, so that after the second limiting protrusion 941 is inserted into the first groove 740 or the second groove 741, when rotated by an external force, it can slide out of the first groove 740 or the second groove 741.

Specifically, when the second rotating shaft 84 is rotated, the fifth gear 74 drives the annular character changing plectrum 30 to rotate, when each through hole of the first through hole group 300 is rotated to face the bottom of each transparent button 50, the second limiting protrusion 941 is rotated to face the first groove 740. Under the elastic force of the elastic member 95, the limiting member 94 is pushed up, and the second limiting protrusion 941 just snaps into the first groove 740. When each through hole of the second through hole group 301 is rotated to face the bottom of each transparent button 50, the second limiting protrusion 941 is rotated to face the second groove 741. Under the elastic force of the elastic member 95, the limiting member 94 is pushed up, and the second limiting protrusion 941 just snaps into the second groove 741. The second limiting protrusion 941 and the first groove 740 and the second groove 741 can play a limiting role to prevent the fifth gear 74 from rotating under the action of other external forces.

It should be noted that as shown in FIG. 11, the function button module 1 includes four function buttons, the transparent pressing member 10 includes four pressing parts 100, and the bottom of each pressing part 100 is equipped with an indicator light 40, each of pressing part 100 is equipped with an opening at the top, so that the light emitted by the indicator light 40 can directly shine on the support plate 200 of the transparent supporting member 20. The annular character changing plectrum 30 is equipped with the first through hole group 300 and the second through hole group 301. The first through hole group 300 and the second through hole group 301 both include through holes of four shapes: "X", "Y", "A", and "B", and the four through holes of the first through hole group 300 and the four through holes of the second through hole group 301 are staggered on the annular character changing plectrum 30. However, the layout of the four through holes "X", "Y", "A", and "B" is different between the first through hole group 300 and the second through hole group 301. In the first through hole group 300, the four through holes "A", "B", "Y", and "X" are sequentially distributed in an annular pattern. In the second through hole group 301, the four through holes "B", "A", "X", and "Y" are sequentially distributed in an annular pattern. Moreover, the through hole of the second through hole group 301 is tilted relative to the through hole of the first through hole group 300, ensuring that the pattern projected onto the transparent button 50 will not be skewed after the annular character changing plectrum 30 rotates.

Furthermore, the function button module 1 with variable function layout further comprising the plectrum support member 60, the plectrum support member 60 is disposed at the gap between the plurality of transparent supporting members 20, the plectrum support member 60 is connected to the casing 2 of the game controller, and the top surface of the plectrum support member 60 and the top surface of the support plate 200 are on the same plane.

Specifically, the plurality of pressing parts 100 of the transparent pressing member 10 are arranged in an annular structure, the plurality of transparent supporting members 20 are arranged in an annular layout of the plurality of pressing parts 100, so that there are gaps between the plurality of transparent supporting members 20. The plectrum support member 60 is disposed in the gap, on the one hand, it does not take up more space; on the other hand, the plectrum support member 60 is used to connect with the housing of the game controller, thereby further supporting the annular character changing plectrum 30.

Furthermore, the indicator light 40 is a two-color indicator light 40. When the annular character changing plectrum 30 is rotated until each through hole of the first through hole group 300 is facing the bottom of each transparent button 50, the two-color indicator light 40 emits light of a first color, and when each through hole of the second through hole group 301 faces the bottom of each transparent button 50, the two-color indicator light 40 emits light of a second color.

Specifically, the display effect of the two-color indicator light 40 is preset, and when the layout of the function buttons is changed, the color of the light emitted by the two-color indicator light 40 is replaced simultaneously. Moreover, in order to further facilitate users to understand which button layout mode the game controller is currently in, in the same button layout mode, each button displays a different color. For example, for the XBOX controller button layout mode, the colors displayed by the indicator lights 40 are: the A button displays a green light, the B button displays a red light, the Y button displays an orange light, and the X button displays a blue light; when switching to the Switch controller button layout mode, the A button shows a red light, the B button shows a green light, the Y button shows a blue light, and the X button shows an orange light.

Referring to FIG. 14, FIG. 14 shows a schematic structural diagram of the fifth embodiment of the game controller. The game controller, comprising: the casing 2, the left joystick assembly 3, the right joystick assembly 2, the direction button assembly 5 and the function button assembly; a circuit board 6 is provided in the casing 2, and button holes are provided on the casing 2, the left joystick assembly 3, the right joystick assembly 4, the direction button assembly 5 are arranged in corresponding button holes, wherein the function button assembly includes the function button module with variable functional layout of the fifth embodiment, the functional button module includes the indicator light 40, the transparent button 50, the transparent pressing member 10, the plurality of transparent supporting members 20, the annular character changing plectrum 30 and the driving assembly, the indicator light 40 is disposed at a preset function button position on the circuit board 6, and the transparent pressing member 10 is disposed at the function button position, the transparent button 50 is arranged in the button hole, the driving assembly is arranged in the casing 2, and a third through hole 21 is provided on the casing 2, the driving part of the driving assembly extends from the third through hole 21 to the outside of the casing 2; when the drive assembly is driven, the driving assembly drives the annular character changing plectrum 30 to rotate until each through hole of the first through hole group 300 faces the bottom of each transparent button 50 or the second through hole group 301 faces the bottom of each transparent button 50. Wherein the function button module with variable function layout further comprising the plectrum support member 60, the plectrum support member 60 is disposed at the gap between the plurality of transparent supporting members 20, the plectrum support member 60 is connected to the casing 2 of the game controller, and the top surface of the plectrum support member 60 and the top surface of the support plate 200 are on the same plane. The inner edge of the annular character changing plectrum 30 is provided with first gear teeth 302, and the driving assembly includes the fifth gear 74 and the second rotating shaft 84, the fifth gear 74 meshes with the first gear teeth 302, the bottom end of the second rotating shaft 84 is fixedly connected to the fifth gear 74, the third through hole 21 is provided on the top surface of the casing 2, and the top end of the second rotating shaft 84 extends through the third through hole 21 to the outside of the casing 2, and the top end of the second rotating shaft 84 is provided with the second groove body, when the second rotating shaft 84 is rotated, the fifth gear 74 drives the annular character changing plectrum 30 to rotate. The driving assembly also includes a limiting member 94 and an elastic member 95, the middle part of the plectrum support member 60 is directly opposite to the annular character changing plectrum 30, and the middle part of the plectrum support member 60 is provided with a mounting hole 600; limiting grooves 601 are provided on both sides of the mounting hole 600, and the diameter of the limiting member 94 matches the diameter of the mounting hole 600; first limiting protrusions 940 are provided on both sides of the limiting member 94, and the first limiting protrusions 940 are arranged in the limiting grooves 601, the elastic member 95 is provided between the bottom of the limiting member 94 and the bottom of the mounting hole 600, and the bottom surface of the fifth gear 74 is provided with a first groove 740 and a second groove 741, the top surface of the limiting member 94 is provided with a second limiting protrusion 941, when the second rotating shaft 84 is rotated, the fifth gear 74 drives the annular character changing plectrum 30 to rotate, when the annular character changing plectrum 30 is rotated until each through hole of the first through hole group 300 is facing the bottom of each transparent button 50 or each through hole of the second through hole group 300 is facing the bottom of each transparent button 50, the second limiting protrusion 941 is locked into the first groove 740 or the second groove 741.

Above are only preferred embodiments of the present disclosure and are not intended to limit the present disclosure. Any modification, equivalent replacement and improvement made within spirit and principle of the present disclosure should be included in protection scope of the present disclosure.

What is claimed is:

1. A function button module with variable function layout, comprising:

a transparent pressing member; a plurality of transparent supporting members; an annular character changing plectrum; a driving assembly;

wherein the transparent pressing member includes a plurality of pressing parts distributed in an annular shape, and an indicator light is provided at the bottom of each pressing part;

the plurality of transparent supporting members include a support plate and two support columns arranged at both ends of the support plate, the support plate is arranged on the top of the pressing part, and transparent buttons are provided on the two support columns;

the annular character changing plectrum is movably arranged on the support plate, and is engaged between the two support columns of each transparent supporting member, so that the annular character changing plectrum rotates around the center of the plurality of support plates when driven; the annular character changing plectrum is provided with a first through hole group and a second through hole group corresponding to different function button layouts;

the output part of the driving assembly is rotationally connected to the annular character changing plectrum, when the driving assembly is driven, the annular character changing plectrum is driven to rotate until each through hole of the first through hole group faces the bottom of each transparent button or each through hole of the second through hole group faces the bottom of each transparent button.

2. The function button module with variable function layout of claim 1, wherein the outer edge of the annular character changing plectrum is provided with first gear teeth, the driving assembly includes a motor switch, a motor assembly and a first gear provided at the output end of the motor assembly, and the first gear meshes with the first gear teeth, the motor switch is electrically connected to the motor assembly; when the motor switch is turned on, the motor assembly drives the annular character changing plectrum to rotate through the first gear.

3. The function button module with variable function layout of claim 1, wherein the outer edge of the annular character changing plectrum is provided with first gear teeth, and the driving assembly includes a second gear and a first rotating shaft, the second gear meshes with the first gear teeth, the top end of the first rotating shaft is fixedly connected to the second gear, and the bottom end of the first rotating shaft is provided with a first groove body, when the first rotating shaft is rotated, the second gear drives the annular character changing plectrum to rotate.

4. The function button module with variable function layout of claim 1, wherein the outer edge of the annular character changing plectrum is provided with first gear teeth, and the driving assembly includes a transmission gear set and a rack; a second gear teeth and a toggle part are respectively provided on both sides of the rack, and the transmission gear set meshes with the first gear teeth and the second gear teeth respectively; when the toggle part is toggled, the annular character changing plectrum is driven to rotate through the transmission gear set.

5. The function button module with variable function layout of claim 1, wherein the outer edge of the annular character changing plectrum is provided with first gear teeth, and the driving assembly includes a third gear, a fourth gear and a knob part, the center of the knob part is connected to the center of the fourth gear, and the third gear meshes with the first gear teeth and the fourth gear respectively, when the knob part is rotated, the fourth gear drives the annular character changing plectrum to rotate through the third gear.

6. The function button module with variable function layout of claim 1, further comprising a plectrum support member, the plectrum support member is disposed at the gap between the plurality of transparent supporting members, the plectrum support member is connected to the casing of the game controller, and the top surface of the plectrum support member and the top surface of the support plate are on the same plane.

7. The function button module with variable function layout of claim 6, wherein the inner edge of the annular character changing plectrum is provided with first gear teeth, and the driving assembly includes a fifth gear and a second rotating shaft, the fifth gear meshes with the first gear teeth, the bottom end of the second rotating shaft is fixedly connected to the fifth gear, and the top end of the second rotating shaft is provided with a second groove body, when the second rotating shaft is rotated, the fifth gear drives the annular character changing plectrum to rotate.

8. The function button module with variable function layout of claim 7, wherein the driving assembly also includes a limiting member and an elastic member, the middle part of the plectrum support member is directly opposite to the annular character changing plectrum, and the middle part of the plectrum support member is provided with a mounting hole; limiting grooves are provided on both sides of the mounting hole, and the diameter of the limiting member matches the diameter of the mounting hole; first limiting protrusions are provided on both sides of the limiting member, and the first limiting protrusions are arranged in the limiting grooves, the elastic member is provided between the bottom of the limiting member and the bottom of the mounting hole, and the bottom surface of the fifth gear is provided with a first groove and a second groove, the top surface of the limiting member is provided with a second limiting protrusion, when the second rotating shaft is rotated, the fifth gear drives the annular character changing plectrum to rotate, when the annular character changing plectrum is rotated until each through hole of the first through hole group is facing the bottom of each transparent button or each through hole of the second through hole group is facing the bottom of each transparent button, the second limiting protrusion is locked into the first groove or the second groove.

9. The function button module with variable function layout of claim 1, wherein the indicator light is a two-color indicator light, when the annular character changing plectrum is rotated until each through hole of the first through hole group is facing the bottom of each transparent button, the two-color indicator light emits light of a first color, and when each through hole of the second through hole group faces the bottom of each transparent button, the two-color indicator light emits light of a second color.

10. A game controller, comprising: the casing, the left joystick assembly, the right joystick assembly, the direction button assembly and the function button assembly; a circuit board is provided in the casing, and button holes are provided on the casing, the left joystick assembly, the right joystick assembly, the direction button assembly are arranged in corresponding button holes, wherein the function button assembly includes the function button module with variable functional layout of claim 1, the functional button module includes the indicator light, the transparent button, the transparent pressing member, the plurality of transparent supporting members, the annular character changing plectrum and the driving assembly, the indicator light is disposed at a preset function button position on the circuit board, and the transparent pressing member is disposed at the function button position, the transparent button is arranged in the button hole, the driving assembly is arranged in the casing, and a third through hole is provided on the casing, a driving part of the driving assembly extends from the third through hole to the outside of the casing; when the drive assembly is driven, the driving assembly drives the annular character changing plectrum to rotate until each through hole of the first through hole group faces the bottom of each transparent button or the second through hole group faces the bottom of each transparent button.

11. The game controller of claim 10, wherein the outer edge of the annular character changing plectrum is provided with the first gear teeth, the driving assembly includes the motor switch, the motor assembly and the first gear provided at the output end of the motor assembly, the first gear meshes with the first gear teeth, and the motor switch is electrically connected with the motor assembly, the motor assembly is arranged in the casing, and the motor switch extends from the third through hole to the outside of the casing, when the motor switch is turned on, the motor assembly drives the annular character changing plectrum to rotate through the first gear.

12. The game controller of claim 10, wherein the outer edge of the annular character changing plectrum is provided with the first gear teeth, and the driving assembly includes the second gear and the first rotating shaft, the second gear meshes with the first gear teeth, and the top end of the first rotating shaft is fixedly connected with the second gear, the third through hole is provided on the bottom surface of the casing, and the bottom end of the first rotating shaft extends through the third through hole to the outside of the casing, the first groove body is provided at the bottom end of the first rotating shaft; when the first rotating shaft is rotated, the second gear drives the annular character changing plectrum to rotate.

13. The game controller of claim 10, wherein the outer edge of the annular character changing plectrum is provided with the first gear teeth, and the driving assembly includes the transmission gear set and the rack, the second gear teeth and the toggle part are respectively provided on both sides of the rack, the support column is provided in the casing, and the transmission gear set is movably provided on the support column, the transmission gear set meshes with the first gear teeth and the second gear teeth respectively, and the toggle part extends through the third through hole to the outside of the casing, when the toggle part is toggled, the annular character changing plectrum is driven to rotate through the transmission gear set.

14. The game controller of claim 10, wherein the outer edge of the annular character changing plectrum is provided with the first gear teeth, and the driving assembly includes the third gear, the fourth gear and the knob part, the center of the knob part is connected to the center of the fourth gear, and the third gear meshes with the first gear teeth and the fourth gear respectively, when the knob part is rotated, the fourth gear drives the annular character changing plectrum to rotate through the third gear.

15. The game controller of claim 10, wherein the function button module also includes the plectrum support member, the plectrum support member is disposed at the gap between the plurality of transparent supporting members, the plectrum support member is connected to the casing of the game controller, and the top surface of the plectrum support member and the top surface of the support plate are on the same plane.

16. The game controller of claim 15, wherein the inner edge of the annular character changing plectrum is provided with first gear teeth, and the driving assembly includes the fifth gear and the second rotating shaft, the fifth gear meshes with the first gear teeth, the bottom end of the second rotating shaft is fixedly connected to the fifth gear, the third through hole is provided on the top surface of the casing, and the top end of the second rotation shaft extends through the third through hole to the outside of the casing, and the top end of the second rotating shaft is provided with the second groove body, when the second rotating shaft is rotated, the fifth gear drives the annular character changing plectrum to rotate.

17. The game controller of claim 16, wherein the driving assembly also includes the limiting member and an elastic member, the middle part of the plectrum support member is directly opposite to the annular character changing plectrum, and the middle part of the plectrum support member is provided with the mounting hole; limiting grooves are provided on both sides of the mounting hole, and the diameter of the limiting member matches the diameter of the mounting hole; the first limiting protrusions are provided on both sides of the limiting member, and the first limiting protrusions are arranged in the limiting grooves, the elastic member is provided between the bottom of the limiting member and the bottom of the mounting hole, and the bottom surface of the fifth gear is provided with the first groove and the second groove, the top surface of the limiting member is provided with the second limiting protrusion, when the second rotating shaft is rotated, the fifth gear drives the annular character changing plectrum to rotate, when the annular character changing plectrum is rotated until each through hole of the first through hole group is facing the bottom of each transparent button or each through hole of the second through hole group is facing the bottom of each transparent button, the second limiting protrusion is locked into the first groove or the second groove.

* * * * *